(12) United States Patent
Geist

(10) Patent No.: US 10,897,963 B2
(45) Date of Patent: Jan. 26, 2021

(54) TILT-LOCK ADJUSTER WITH TENSION INDICATOR

(71) Applicant: Indiana Mills & Manufacturing, Inc., Westfield, IN (US)

(72) Inventor: Christopher Geist, Westfield, IN (US)

(73) Assignee: Indiana Mills & Manufacturing, Inc., Westfield, IN (US)

(*) Notice: Subject to any disclaimer, the term of this patent is extended or adjusted under 35 U.S.C. 154(b) by 0 days.

(21) Appl. No.: 16/010,633

(22) Filed: Jun. 18, 2018

(65) Prior Publication Data
US 2019/0380451 A1   Dec. 19, 2019

(51) Int. Cl.
A44B 11/10 (2006.01)
A44B 11/12 (2006.01)
A44B 11/16 (2006.01)
A44B 11/00 (2006.01)

(52) U.S. Cl.
CPC ............ *A44B 11/10* (2013.01); *A44B 11/008* (2013.01); *A44B 11/12* (2013.01); *A44B 11/16* (2013.01)

(58) Field of Classification Search
CPC ....... A44B 11/088; A44B 11/12; A44B 11/16; A44B 11/065; A44B 11/10
See application file for complete search history.

(56) References Cited

U.S. PATENT DOCUMENTS

| | | | |
|---|---|---|---|
| 3,182,372 A | 5/1965 | Darrell | |
| D218,589 S | 9/1970 | Lohr | |
| D382,470 S | 8/1997 | Lu | |
| D391,140 S | 2/1998 | Field | |
| D496,881 S | 10/2004 | Pontaoe | |
| 6,948,219 B2 | 9/2005 | Kakuda et al. | |
| D592,542 S | 5/2009 | Pontaoe | |
| D625,656 S | 10/2010 | Kosh et al. | |

(Continued)

FOREIGN PATENT DOCUMENTS

| | | |
|---|---|---|
| CA | 2 462 314 A1 | 10/2004 |
| EP | 1 247 704 A2 | 10/2002 |

(Continued)

OTHER PUBLICATIONS

U.S. Appl. No. 29/617,370, filed Sep. 13, 2017 to Geist.

(Continued)

*Primary Examiner* — Robert Sandy
*Assistant Examiner* — David M Upchurch
(74) *Attorney, Agent, or Firm* — Woodard, Emhardt, Henry, Reeves & Wagner, LLP

(57) ABSTRACT

A tilt-lock adjuster system includes a tilt-lock adjuster that is used to tighten and loosen webbing. The tilt-lock adjuster includes an indicator configured to indicate when proper tension is applied to the webbing. The tilt-lock adjuster has a frame to which the indicator is slidably coupled and a web bar slidably coupled to the frame. The web bar is asymmetric for one way assembly with the frame. The web bar has a web engagement notch that is concave for enhancing locking of the webbing to the frame. The web bar has a frame guide slidably engaged to the frame. The frame defines a web opening in which the frame engagement ledge extends. The frame guide of the web bar includes a key guide foot. The frame has an orientation notch configured to receive the key guide foot of the web bar.

24 Claims, 22 Drawing Sheets

(56) References Cited

U.S. PATENT DOCUMENTS

| | | |
|---|---|---|
| D627,684 S | 11/2010 | Curtis et al. |
| D683,654 S | 6/2013 | Andren et al. |
| 8,813,322 B2 | 8/2014 | Novara |
| 2003/0197415 A1 | 10/2003 | Dingman |
| 2007/0068282 A1 | 3/2007 | Nakagawa et al. |
| 2007/0114774 A1 | 5/2007 | Lang et al. |
| 2008/0072404 A1 | 3/2008 | Wetter |
| 2008/0251002 A1 | 10/2008 | Burleigh |
| 2008/0296944 A1* | 12/2008 | Nakagawa ........... B60N 2/2809 297/250.1 |
| 2017/0106833 A1 | 4/2017 | Marriott et al. |
| 2018/0222439 A1* | 8/2018 | Eaton ................... B60R 22/206 |

FOREIGN PATENT DOCUMENTS

| | | |
|---|---|---|
| EP | 1 468 868 A2 | 10/2004 |
| EP | 1 552 993 A1 | 7/2005 |
| EP | 1 697 162 B1 | 9/2006 |
| KR | 10-1421877 B1 | 7/2014 |
| WO | 2006/059114 A1 | 6/2006 |

OTHER PUBLICATIONS

International Patent Application PCT/US2019/037485 Search Report dated Sep. 20, 2019. 2 pages.
International Patent Application PCT/US2019/037485 Written Opinion dated Sep. 20, 2019. 5 pages.
Shield Restraint Systems, Inc.: Vehicle Attachment Systems. Copyright 2014. [retrieved Apr. 5, 2018]. 1 page. Retrieved from the Internet: <URL: http://http://www.trustshield.com/wp-content/uploads/2014/09/vehicle-attachment-systems.pdf>.

* cited by examiner

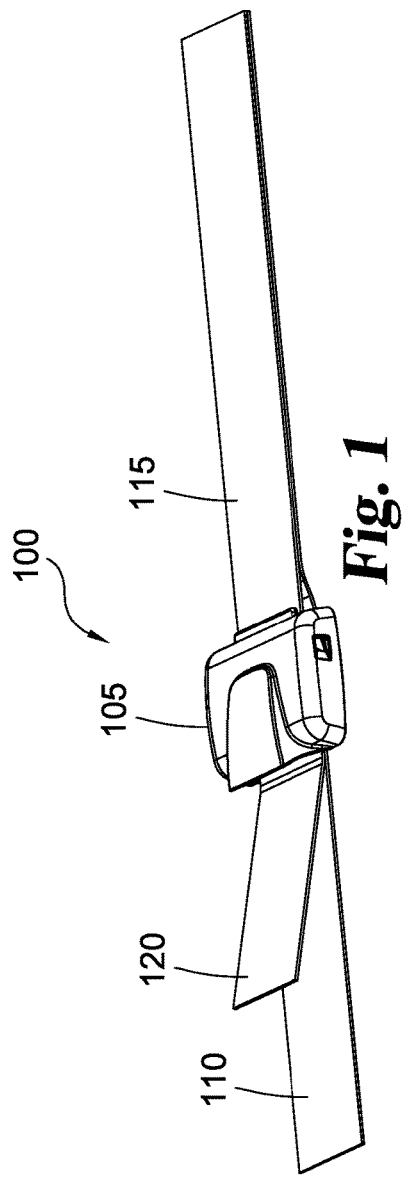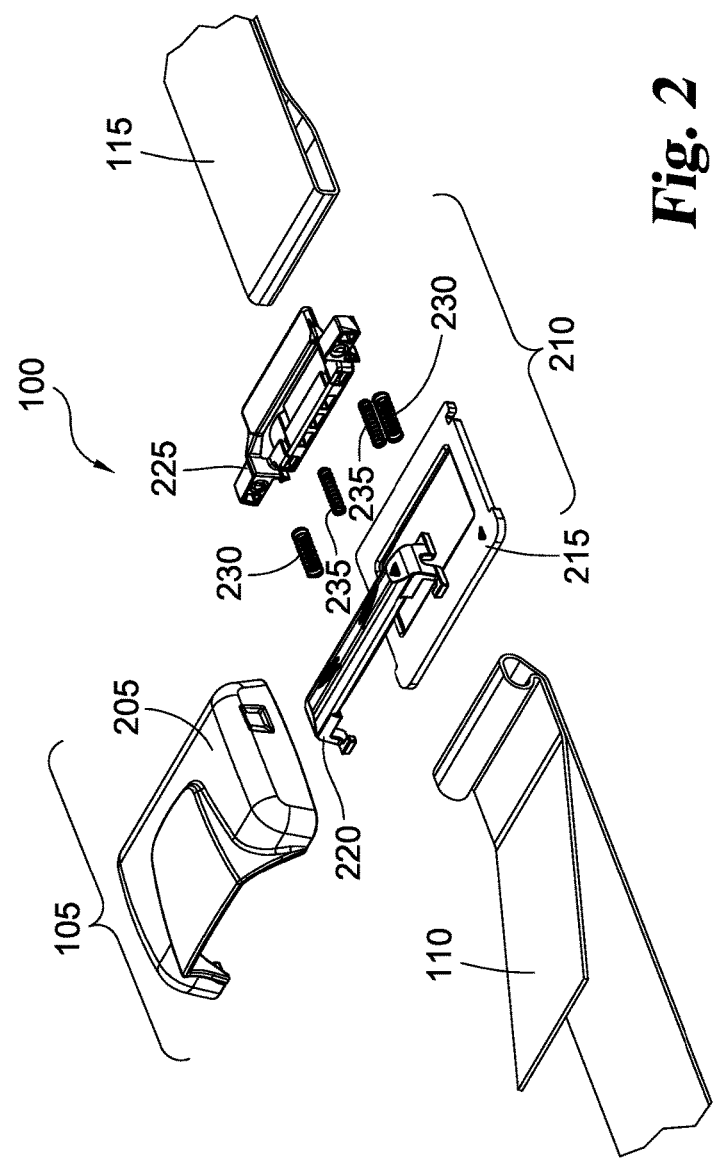

TILT-LOCK ADJUSTER WITH TENSION INDICATOR

BACKGROUND

In child car seats and other vehicular restraint systems, it can be difficult to determine whether the restraint systems are properly secured to the vehicle. For example in Lower Anchors and Tethers for Children (LATCH) systems, an adjustable belt is typically used to secure the car seat to the lower anchors and/or the tether anchors inside the vehicle. If the belt is too loose or otherwise improperly secured, the car seat may not properly function during an accident. Belt tension indicators have been proposed as separate components or incorporated into button actuated adjusters, but these systems have a number of significant drawbacks. For example, these type of indicator systems can be expensive to manufacture, difficult to use, and may not be readily visible in the tight confines where car seats are typically installed.

Thus, there is a need for improvement in this field.

SUMMARY

A unique tilt-lock adjuster system has been developed. As compared to button type adjusters, the tilt-lock adjuster is easier to use. Moreover, the system incorporates a unique indicator that is not only visible from the top but also from the sides which can be especially helpful in tight environments such as when installing a car seat in the back seat of a vehicle. The system further includes a unique web bar system that simplifies assembly as well as ensures that the adjuster belt is firmly secured. Traditional web bars are typically flat because the web bars are manufactured using a stamping process that limits the geometry of the web bars. Among other things, this limited geometry impacts how strongly the web is secured. The web bar in one form of this tilt-lock adjuster system is made from a casting process that allows the web bar to have a more complicated geometry that facilitates better clamping between the web bar and frame as well as allows the web bar to have an asymmetric shape for facilitating installation in only one orientation. In one particular form, the web bar is manufactured using cast zinc.

Aspect 1 generally concerns a system that includes a tension indicator on a tilt-lock adjuster.

Aspect 2 generally concerns the system of aspect 1 in which the tilt-lock adjuster includes a cast web bar.

Aspect 3 generally concerns the system of aspect 2 in which the web bar is asymmetric for one way assembly.

Aspect 4 generally concerns the system of aspect 3 in which the web bar has a concave bar notch for better locking.

Aspect 5 generally concerns the system of aspect 4 in which the web bar has a frame guide slidably engaged to a frame.

Aspect 6 generally concerns the system of aspect 5 in which the web bar has a frame engagement ledge that defines a guide gap that is smaller than the thickness of the frame.

Aspect 7 generally concerns the system of aspect 6 in which the frame defines a web opening in which the frame engagement ledge extends.

Aspect 8 generally concerns the system of aspect 7 in which the frame has an orientation notch configured to receive a key guide foot of the web bar.

Aspect 9 generally concerns the system of aspect 2 in which the web bar and indicator move independently.

Aspect 10 generally concerns the system of aspect 9 in which the tilt-lock adjuster includes one or more web bar springs positioned between the web bar and indicator.

Aspect 11 generally concerns the system of aspect 1 in which the indicator includes side and top indicators.

Aspect 12 generally concerns the system of aspect 11 in which the side indicator has a window that is asymmetric or angled towards the viewer.

Aspect 13 generally concerns the system of aspect 11 in which the side indicator includes lateral tension indicators.

Aspect 14 generally concerns the system of aspect 11 in which the indicator includes an indicator guide flange that is recessed relative to the top indicator.

Aspect 15 generally concerns the system of aspect 1 in which the indicator includes one or more indicator springs to bias the indicator in a retracted position.

Aspect 16 generally concerns the system of aspect 15 in which the indicator includes one or more indicator spring seat cavities where the indicator springs are secured.

Aspect 17 generally concerns the system of aspect 1 in which the tilt-lock adjuster includes a web bar and a frame with orientation guides.

Aspect 18 generally concerns the system of aspect 1 in which the tilt-lock adjuster includes a cover with one or more ribs defining an indicator cavity.

Aspect 19 generally concerns the system of any previous aspect in which the tilt-lock adjuster includes a cast web bar.

Aspect 20 generally concerns the system of any previous aspect in which the web bar is asymmetric for one way assembly.

Aspect 21 generally concerns the system of any previous aspect in which the web bar has a concave bar notch for better locking.

Aspect 22 generally concerns the system of any previous aspect in which the web bar has a frame guide slidably engaged to a frame.

Aspect 23 generally concerns the system of any previous aspect in which the web bar has a frame engagement ledge that defines a guide gap that is smaller than the thickness of the frame.

Aspect 24 generally concerns the system of any previous aspect in which the frame defines a web opening in which the frame engagement ledge extends.

Aspect 25 generally concerns the system of any previous aspect in which the frame has an orientation notch configured to receive a key guide foot of the web bar.

Aspect 26 generally concerns the system of any previous aspect in which the web bar and indicator move independently.

Aspect 27 generally concerns the system of any previous aspect in which the tilt-lock adjuster includes one or more web bar springs positioned between the web bar and indicator.

Aspect 28 generally concerns the system of any previous aspect in which the indicator includes side and top indicators.

Aspect 29 generally concerns the system of any previous aspect in which the side indicator has a window that is asymmetric or angled towards the viewer.

Aspect 30 generally concerns the system of any previous aspect in which the side indicator includes lateral tension indicators.

Aspect 31 generally concerns the system of any previous aspect in which the indicator includes an indicator guide flange that is recessed relative to the top indicator.

Aspect 32 generally concerns the system of any previous aspect in which the indicator includes one or more indicator springs to bias the indicator in a retracted position.

Aspect 33 generally concerns the system of any previous aspect in which the indicator includes one or more indicator spring seat cavities where the indicator springs are secured.

Aspect 34 generally concerns the system of any previous aspect in which the tilt-lock adjuster includes a web bar and a frame with orientation guides.

Aspect 35 generally concerns the system of any previous aspect in which the tilt-lock adjuster includes a cover with one or more ribs defining an indicator cavity.

Further forms, objects, features, aspects, benefits, advantages, and embodiments of the present invention will become apparent from a detailed description and drawings provided herewith.

BRIEF DESCRIPTION OF THE DRAWINGS

FIG. 1 is a perspective view of a tilt-lock adjuster system according to one example.

FIG. 2 is an exploded view of the FIG. 1 tilt-lock adjuster system.

DETAILED DESCRIPTION OF THE SELECTED EMBODIMENTS

Figure 3:
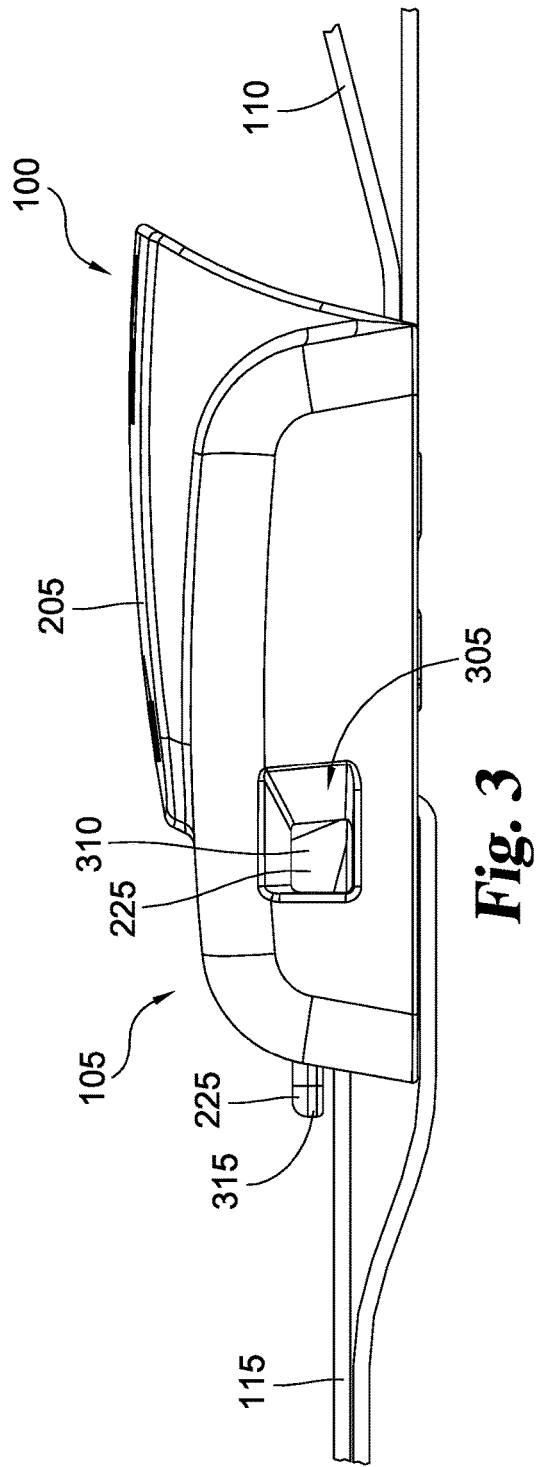
FIG. 3 is a first side view of the FIG. 1 tilt-lock adjuster system in a tensioned configuration.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

FIG. 1 shows a top perspective view of a tilt-lock adjuster system 100 according to one example. As shown, the tilt-lock adjuster system 100 includes a tilt-lock adjuster 105 with a tension web 110 and fixed web 115 attached at opposite ends. In one example, the ends of the tension web 110 and fixed web 115 are secured to latch type clips which in turn are secured to latch anchors in a vehicle. It should be recognized that the tilt-lock adjuster system 100 can be used in other situations. The tension web 110 is looped in the tilt-lock adjuster 105. By pulling on a belt adjuster end 120 of the tension web 110, a user is able to tighten tension web 110 and fixed web 115. The tilt-lock adjuster 105 is configured to hold the tension web 110 in the tensioned state. The tilt-lock adjuster 105 can be lifted to release the tension in the tension web 110 and fixed web 115.

FIG. 2 shows an exploded view of the tilt-lock adjuster system 100. As can be seen, the tilt-lock adjuster 105 includes a cover 205 that covers an adjuster indicator assembly 210 to which the tension web 110 and fixed web 115 are secured. The cover 205 includes a frame 215, a web bar 220 slidably coupled to the frame 215, and an indicator 225 slidably coupled to the frame 215 to indicate whether the tension web 110 is properly tensioned. One or more web bar springs 230 are disposed between the web bar 220 and the indicator 225. In one form, the web bar springs 230 act as a buffer by biasing apart the web bar 220 and indicator 225. In the illustrated example, the adjuster indicator assembly 210 has two (2) web bar springs 230, but in other examples, the adjuster indicator assembly 210 can have more or less web bar springs 230 than is shown. The adjuster indicator assembly 210 further includes one or more indicator springs 235 that bias the indicator 225 to a retracted position indicating that insufficient tension has been applied to the fixed web 115. In the depicted example, the adjuster indicator assembly 210 has two (2) indicator springs 235, but in other examples, the adjuster indicator assembly 210 can have more or less indicator springs 235 than is shown. In one example, the cover 205 and indicator 225 are made of plastic, and the frame 215, web bar 220, web bar springs 230, and indicator springs 235 are made of metal. However, these components can be made of other types of materials and/or with different combinations of materials in other examples.

Figure 4:
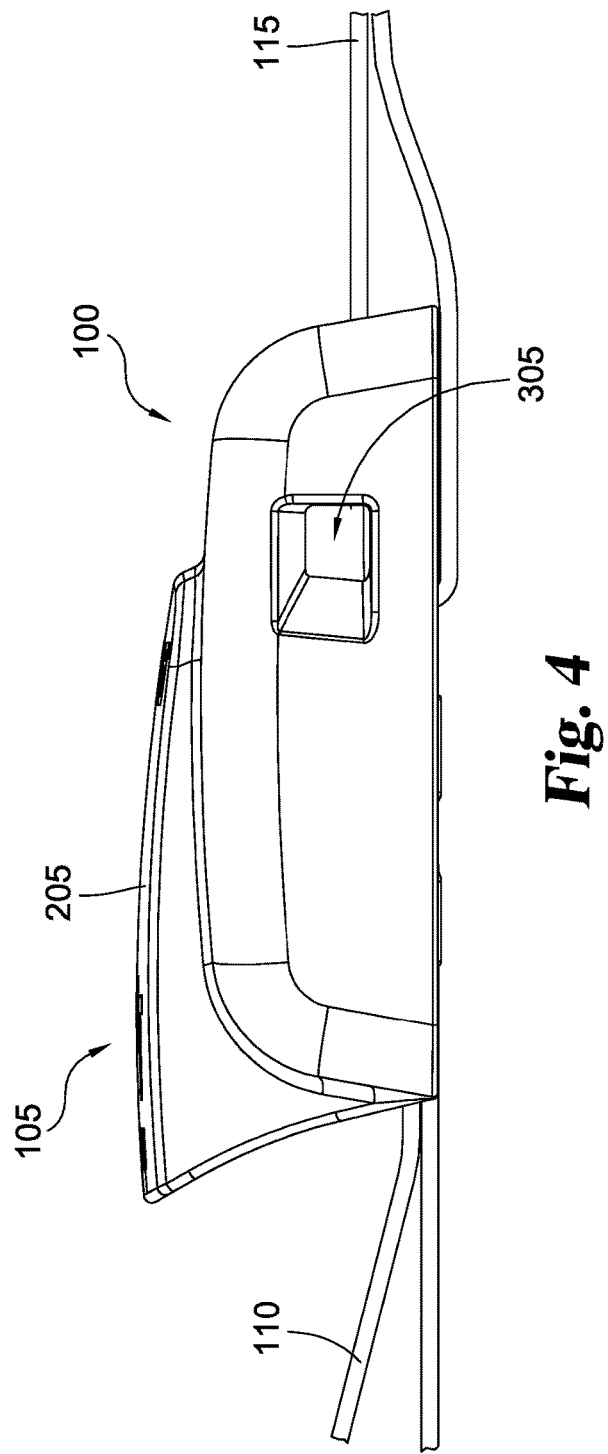
FIG. 4 is a second side view of the FIG. 1 tilt-lock adjuster system in an untensioned configuration.
Figure 5:
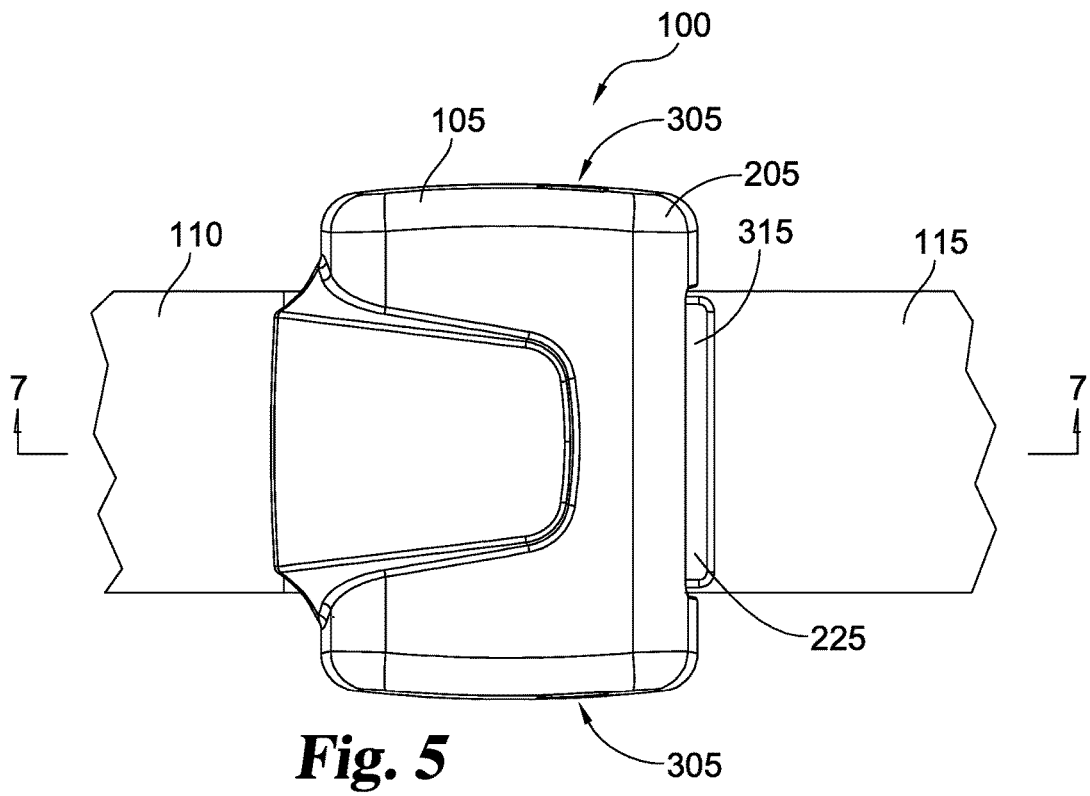
FIG. 5 is a top view of the FIG. 1 tilt-lock adjuster system.
Figure 6:
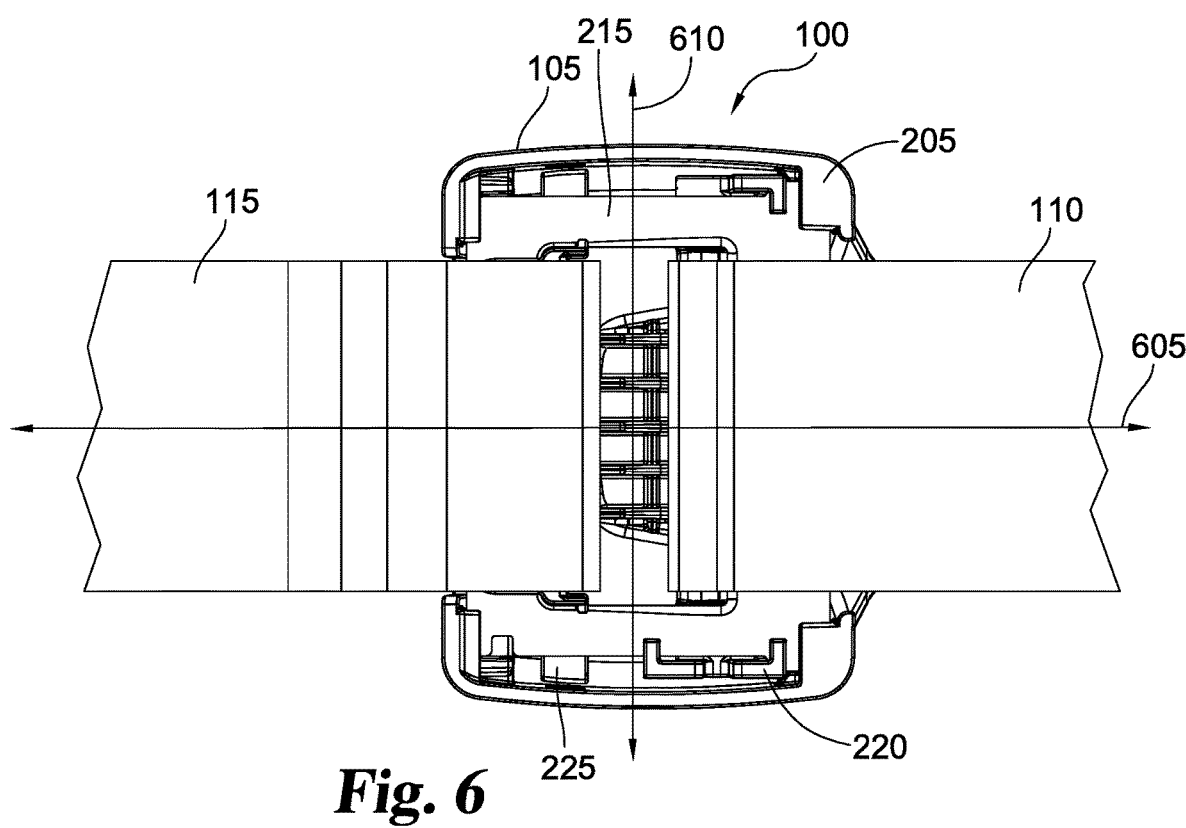
FIG. 6 is a bottom view of the FIG. 1 tilt-lock adjuster system.

Looking at FIGS. 3, 4, 5, and 6, the cover 205 has one or more lateral windows 305 on opposing lateral sides through which one or more lateral tension indicators 310 of the indicator 225 can be viewed when the tilt-lock adjuster system 100 is adequately tensioned. As will be explained in greater detail below, the lateral windows 305 have an asymmetric shape so as to enhance visibility such as for example when the fixed web 115 is secured to a tether via a latch clip or in some other manner. Normally, but not always, the fixed web 115 is relatively short as compared to the tension web 110, and the fixed web 115 is secured in relatively close or tight conditions such as a lower anchor in a vehicle seat. The lateral windows 305 are angled away from the fixed web 115 (and the vehicle seat) so as to enhance operator visibility of the lateral tension indicators 310 when tightening the tension web 110 with the tilt-lock adjuster 105. When the tension web 110 reaches sufficient tension, not only are the lateral tension indicators 310 of the indicator 225 are visible, a longitudinal tension indicator 315 of the indicator 225 visible from the top. FIG. 4 shows the indicator 225 in a retracted state where insufficient tension has been applied to the tilt-lock adjuster system 100. As can be seen, the lateral tension indicators 310 and longitudinal tension indicator 315 are not visible to the user when the indicator 225 is in a retracted state. FIGS. 3 and 5 show the indicator 225 in an extended or activated position when proper tension is applied to the tilt-lock adjuster system 100. In one form, the lateral tension indicators 310 and longitudinal tension indicator 315 are colored, marked, shaped, and/or otherwise indicated that sufficient tension has been applied. For instance, at least the lateral tension indicators 310 and longitudinal tension indicator 315 are colored green so as indicate proper tensioning, and in other variations, the entire indicator 225 is green such as by being made from injection molded green plastic. It should be recognized that in other variations other types of indicators can be used to signify sufficient web tensioning. As can be seen in FIG. 6, the tilt-lock adjuster 105 has a longitudinal axis 605 that extends generally in the same direction along the tilt-lock adjuster 105, tension web 110, and fixed web 115, and a lateral axis 610 that extends perpendicular to the longitudinal axis 605.

Figure 7:
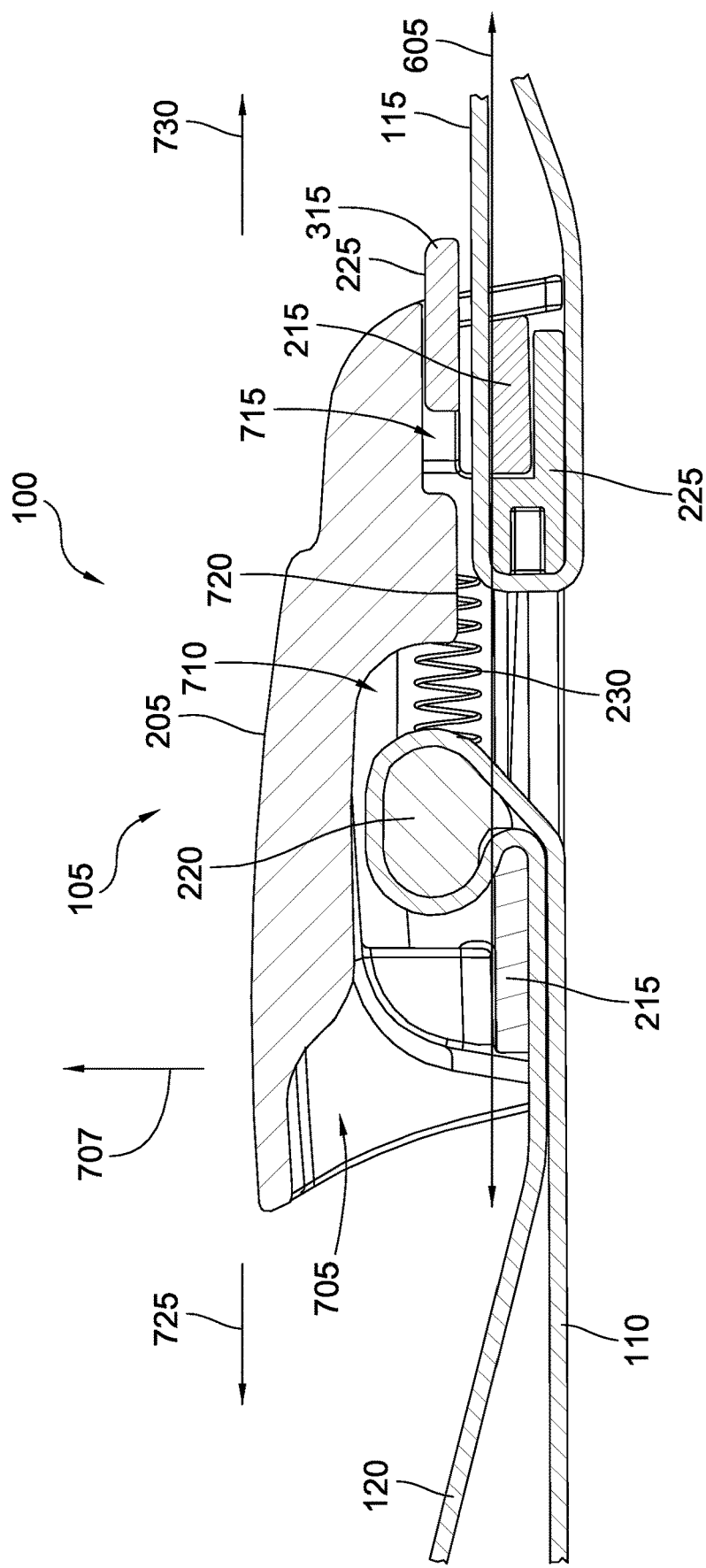
FIG. 7 is a cross-sectional view of the FIG. 1 tilt-lock adjuster system as taken along line 7-7 in FIG. 5.

A cross-sectional view of the tilt-lock adjuster system 100 as taken along line 7-7 in FIG. 5 is shown in FIG. 7. As shown, the tension web 110 is wrapped around the web bar 220. The fixed web 115 is wrapped around the indicator 225 and through the frame 215. The web bar 220 and indicator 225 are able to slide or move independently of one another. Again, in one example, the web bar springs 230 bias the web bar 220 and indicator 225 away from one another. In further variations, the web bar springs 230 bias the web bar 220 so that the belt adjuster end 120 of the tension web 110 is cinched between the web bar 220 and the frame 215. In still yet other examples, the web bar springs 230 are eliminated altogether or replaced with a different type of biasing mechanism. The engagement between the frame 215 and web bar 220 holds the tension web 110 in place at the desired tension. The cover 205 defines a grip cavity 705 where a user is able to lift the end of the tilt-lock adjuster 105 by the tension web 110 in a direction indicated by arrow 707 to release tension from the tension web 110. The cover 205 further defines a web bar cavity 710 and an indicator cavity 715 in the tilt-lock adjuster 105 that is separated by a stop member 720. The web bar cavity 710 helps to guide the movement of the web bar 220, and the indicator cavity 715 helps with guiding the movement of the indicator 225 inside the tilt-lock adjuster 105. The stop member 720 inhibits the web bar 220 and indicator 225 from contacting one another.

Referring again to FIGS. 3, 5, 6, and 7, the tilt-lock adjuster system 100 is tightened by pulling the belt adjuster end 120 generally in a direction indicated by arrow 725 along the longitudinal axis 605. While tension is applied between the tension web 110 and fixed web 115, the indicator 225 compresses the indicator springs 235 against the frame 215 in the tilt-lock adjuster 105 (FIG. 2) such that the indicator 225 moves in the longitudinal axis 605 to the extended position. When sufficient tension is applied to overcome the spring force of the indicator springs 235, the indicator 225 moves in the direction along the longitudinal axis 605 as indicated by arrow 730 in FIG. 7 to the extended position where the lateral tension indicators 310 and longitudinal tension indicator 315 are visible. To loosen or release the tension web 110 and fixed web 115, the user grips the cover 205 at the grip cavity 705 and lifts in the direction generally indicated by arrow 707. The stop member 720 disengages from the indicator cavity 715 to allow the tension web 110 to slide in between.

Figure 8:
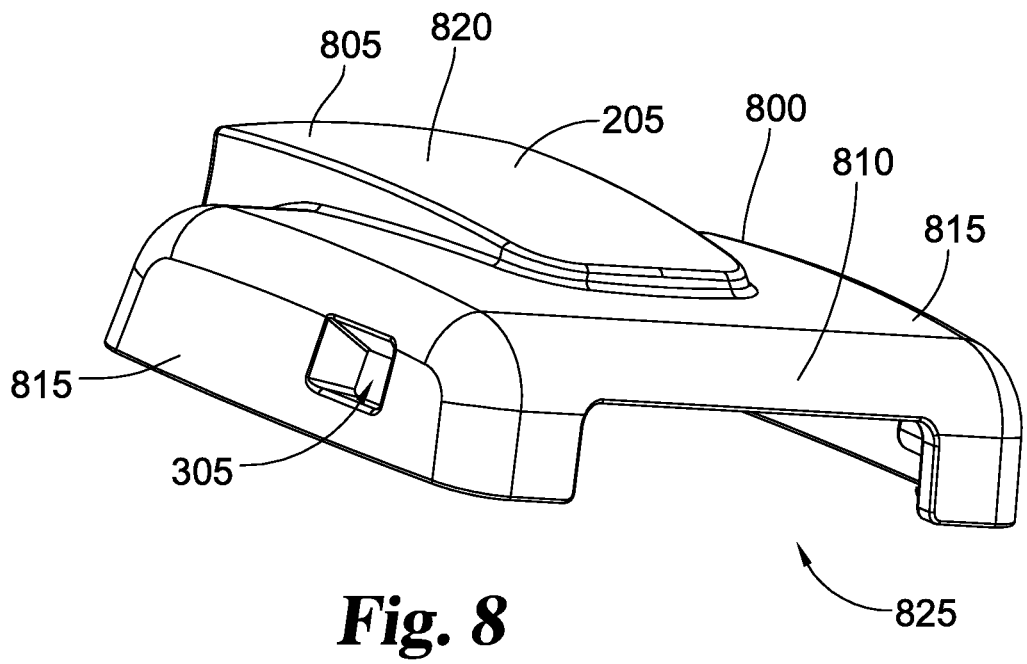
FIG. 8 is a top perspective view of a cover for the FIG. 1 tilt-lock adjuster system.
Figure 9:
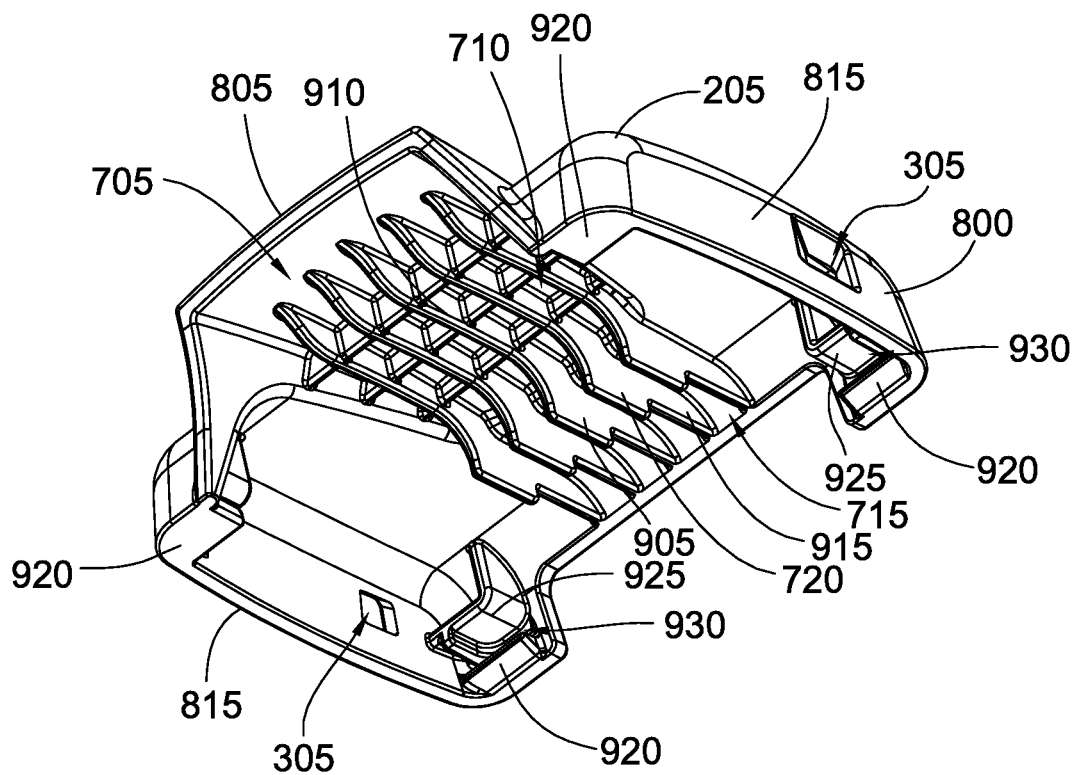
FIG. 9 is a bottom perspective view of the FIG. 8 cover.

FIGS. 8 and 9 respectively show top and bottom perspective views of the cover 205. As illustrated, the cover 205 has a cover body 800 with a grip end 805 and an indicator end 810 with one or more lateral sidewalls 815 extending in between. A grip protrusion 820 extends from the cover body 800. At the grip end 805, the grip protrusion 820 defines in part the grip cavity 705 where the user is able to lift the tilt-lock adjuster 105 in order to release the tension web 110. In one form, the cover 205 is made from injection molded plastic, but in other variations, the cover 205 can be made from different materials or a combination of materials. For instance, the grip end 805 of the cover body 800 can be made of metal to provide further strength. The cover body 800 at the indicator end 810 defines an indicator notch 825 through which the longitudinal tension indicator 315 of the indicator 225 extends. The lateral windows 305 are defined in the lateral sidewalls 815. In the illustrated example, the lateral sidewalls 815 are configured to be generally the same, but in other examples, the lateral sidewalls 815 can be different from one another.

Figure 10:
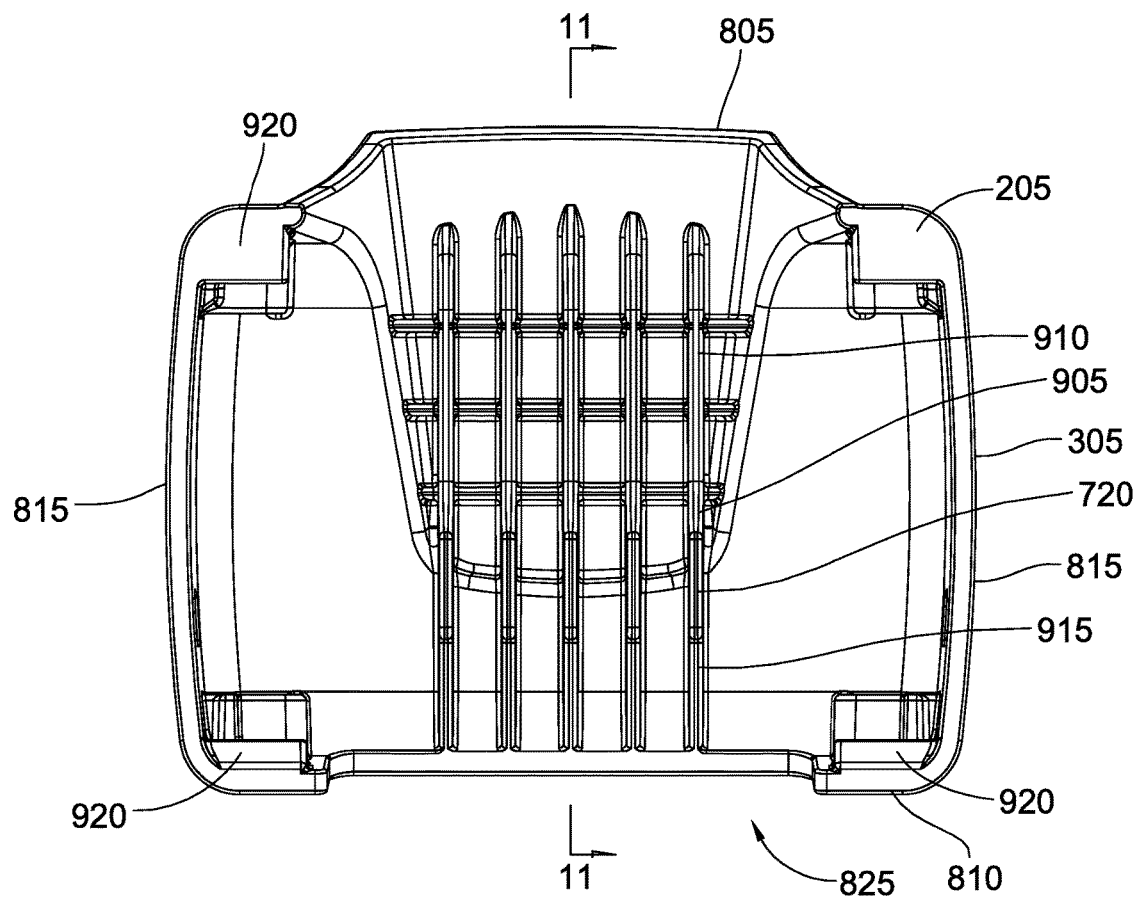
FIG. 10 is a bottom view of the FIG. 8 cover.
Figure 11:
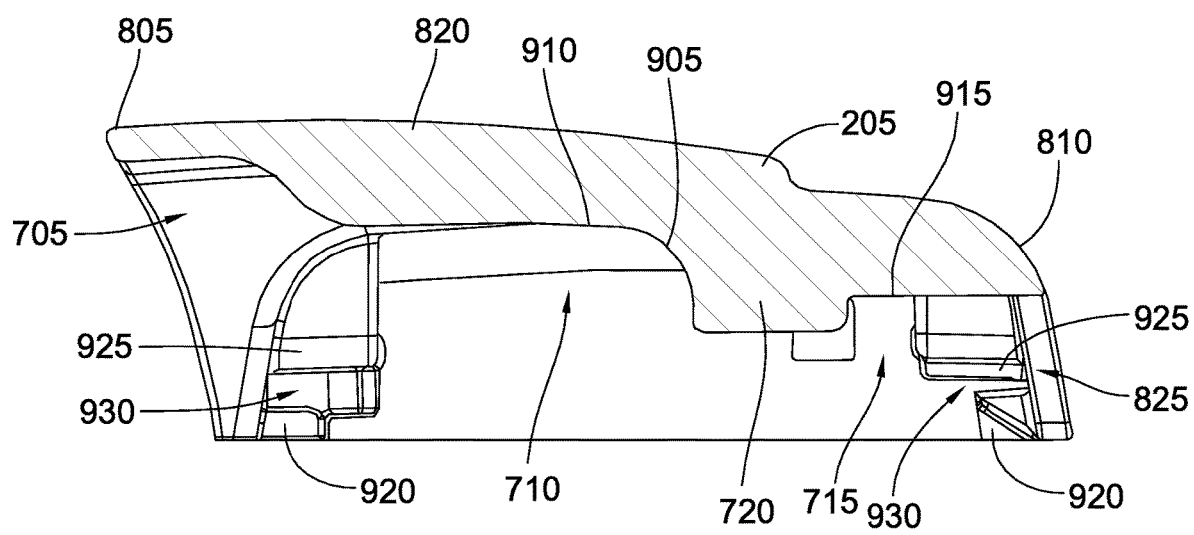
FIG. 11 is a cross-sectional view of the FIG. 8 cover as taken along line 11-11 in FIG. 10.

Turning to FIGS. 9, 10, and 11, the cover body 800 has one or more ribs 905 that face the adjuster indicator assembly 210. Each of the ribs 905 has a tension web section 910 and an indicator section 915 spaced apart from the ribs 905 by the stop member 720. Together the tension web section 910 of each of the ribs 905 defines the web bar cavity 710, and the indicator section 915 of each of the ribs 905 form the indicator cavity 715. The tension web section 910 of each indicator section 915 has a scooped or curved shape to facilitate smooth movement of the tension web 110 within the tilt-lock adjuster 105. On each of the ribs 905, the indicator section 915 helps to smoothly guide the indicator 225. The cover body 800 of the cover 205 has one or more frame clips 920 with corresponding frame standoffs 925 that together define one or more frame notches 930 in which the frame 215 is secured. In the illustrated example, the cover 205 has four (4) frame standoffs 925 located at the corners of the frame 215, but other examples can have fewer or more frame standoffs 925 secured at other locations on the frame 215.

Figure 12:
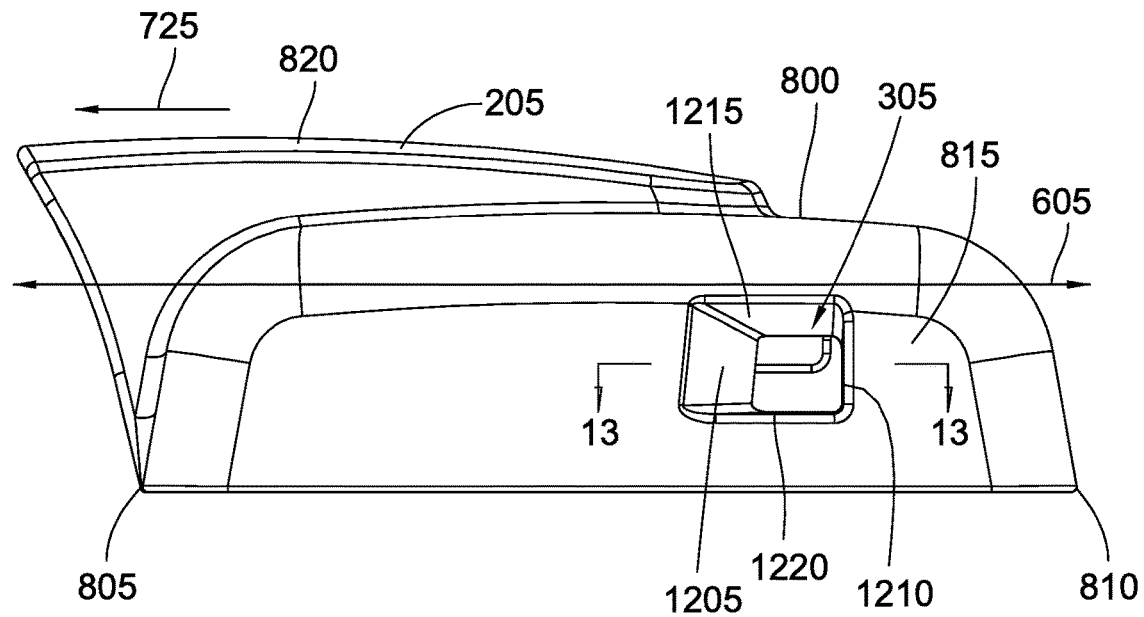
FIG. 12 is a side view of the FIG. 8 cover.
Figure 13:
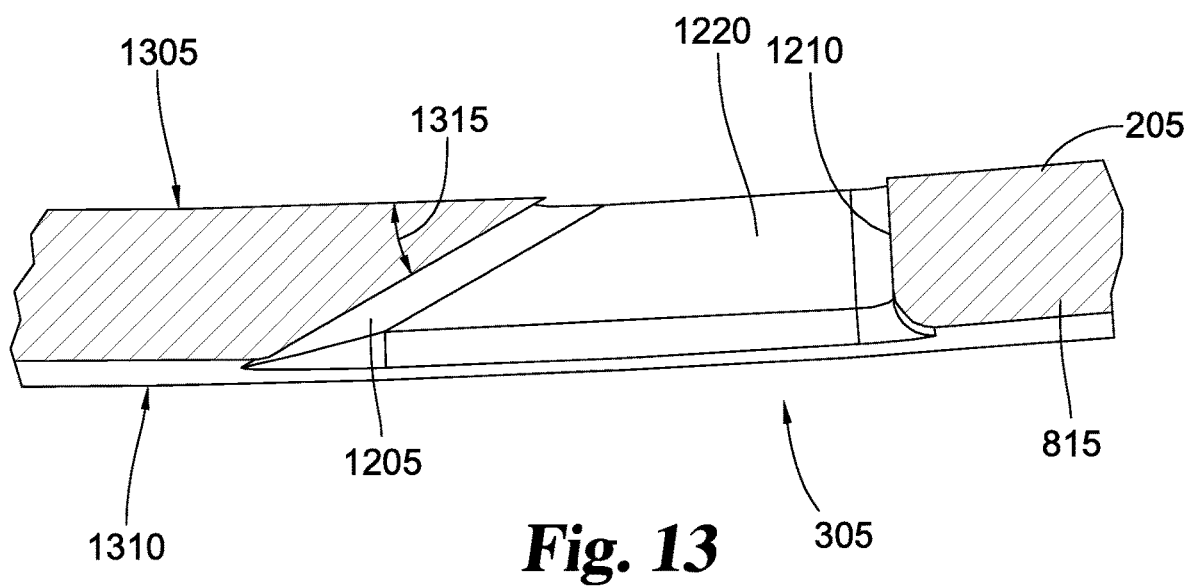
FIG. 13 is a cross-sectional view of the FIG. 8 cover as taken along line 13-13 in FIG. 12.

As noted before, the lateral windows 305 have an asymmetric shape that allows the lateral tension indicators 310 of the indicator 225 to be visible even when secured in cramped conditions. Looking at FIGS. 12 and 13, the lateral windows 305 in the lateral sidewalls 815 are defined by a trailing jamb edge 1205 and a leading jamb edge 1210 that is located opposite the trailing jamb edge 1205 as well as a head jamb edge 1215 and a sill edge 1220 extending between the trailing jamb edge 1205 and the leading jamb edge 1210. Typically, but not always, the tilt-lock adjuster 105 during tensioning is viewed from the top and from the grip end 805. As shown, the trailing jamb edge 1205 is beveled along the longitudinal axis 605 towards the grip end 805 as indicated by arrow 725 in FIG. 12. Likewise, the head jamb edge 1215 is beveled towards the top of the cover 205. In the illustrated example, the leading jamb edge 1210 and sill edge 1220 are not beveled. As depicted in FIG. 13, the cover 205 has an interior surface 1305 and an exterior surface 1310. The trailing jamb edge 1205 extends at a trailing jamb angle 1315 relative to the interior surface 1305 that is an acute angle (i.e., less than 90 degrees). The head jamb edge 1215 similarly extends at an acute angle relative to the interior surface 1305. In one form, the trailing jamb angle 1315 for the trailing jamb edge 1205 and the head jamb edge 1215 are less than 90 degrees, and more specifically, less than 45 degrees. As can be seen, the leading jamb edge 1210 and the sill edge 1220 are angled generally perpendicular to the interior surface 1305 in the depicted example. In the illustrated example, the lateral windows 305 are openings that extend completely through the lateral sidewalls 815 from the exterior surface 1310 to the interior surface 1305. In other examples, the lateral windows 305 can include transparent or semi-transparent material, such as clear plastic, that allows to the lateral tension indicators 310 of the indicator 225 to be visible to the user.

Figure 14:
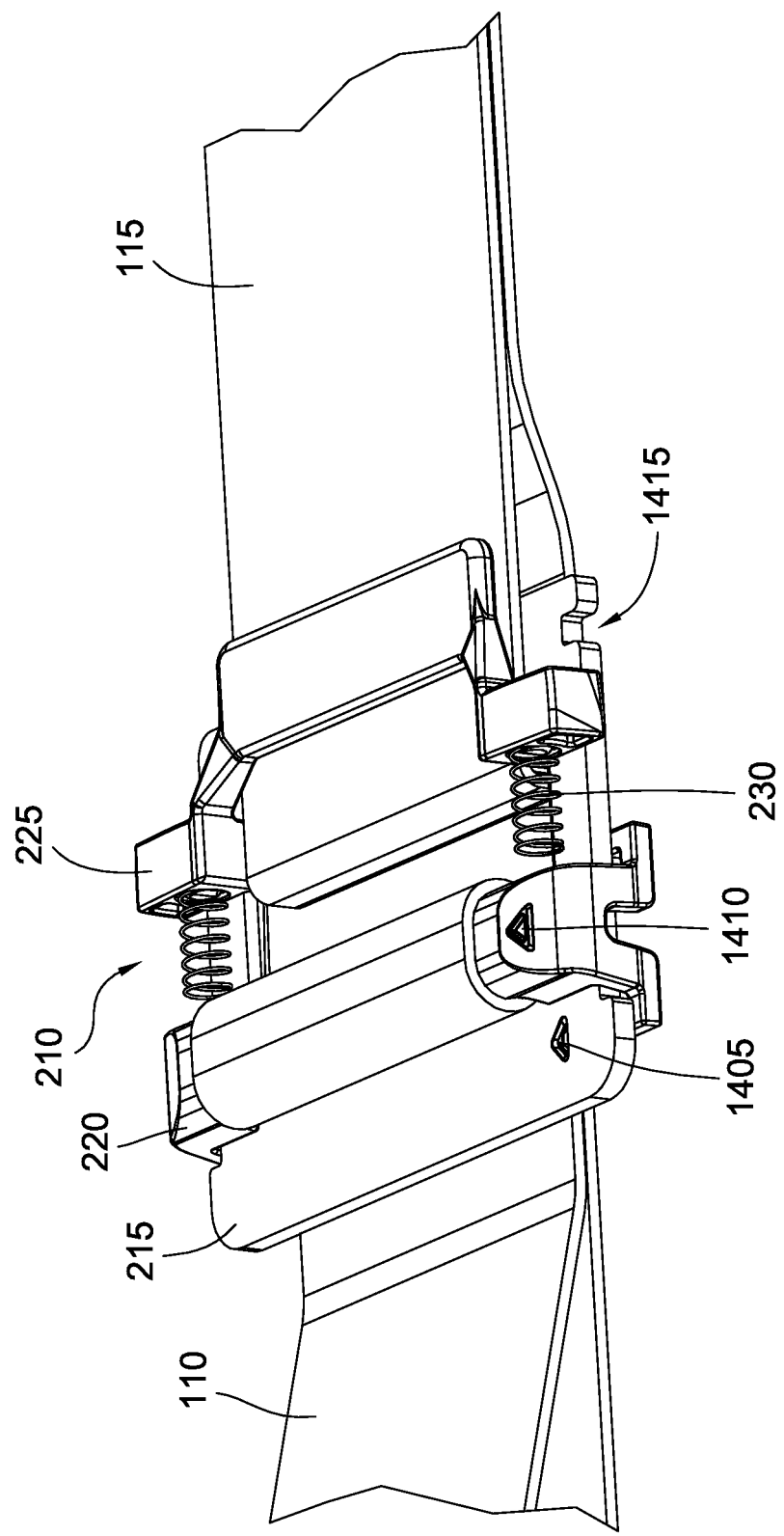
FIG. 14 is a top perspective view of the FIG. 1 tilt-lock adjuster system with the FIG. 8 cover removed.
Figure 15:
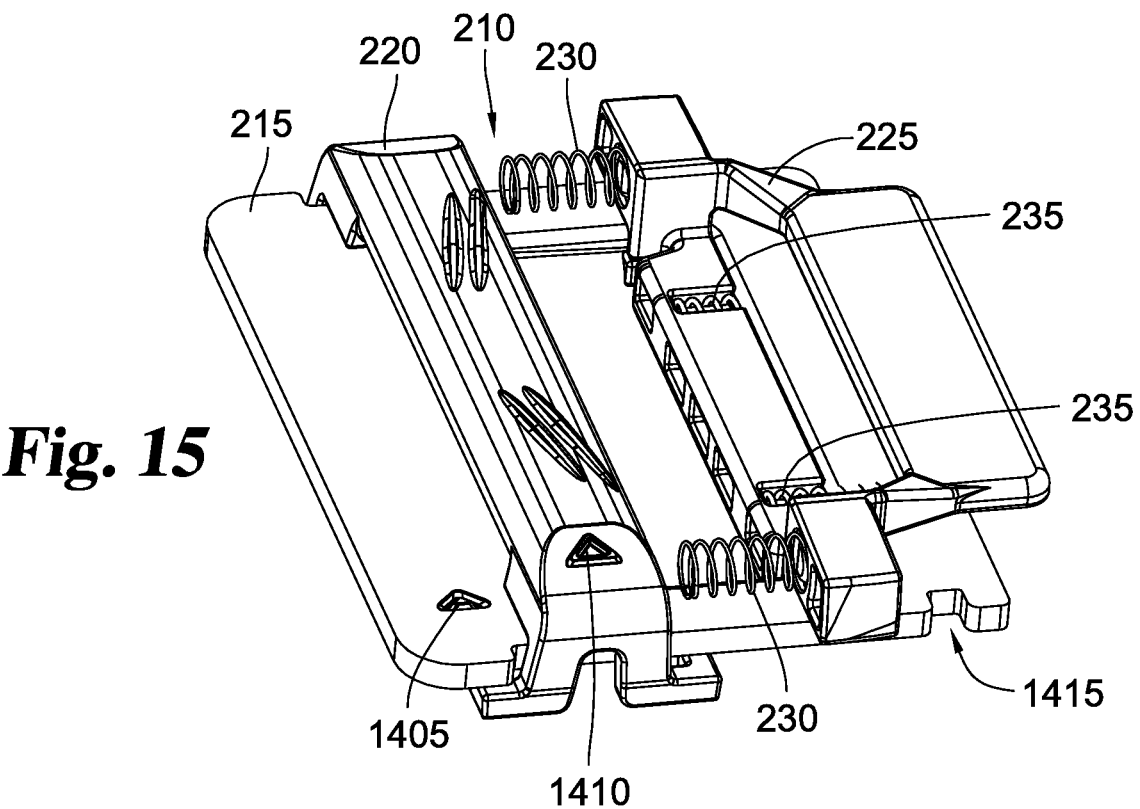
FIG. 15 is a top perspective view of a lock adjuster assembly.
Figure 16:
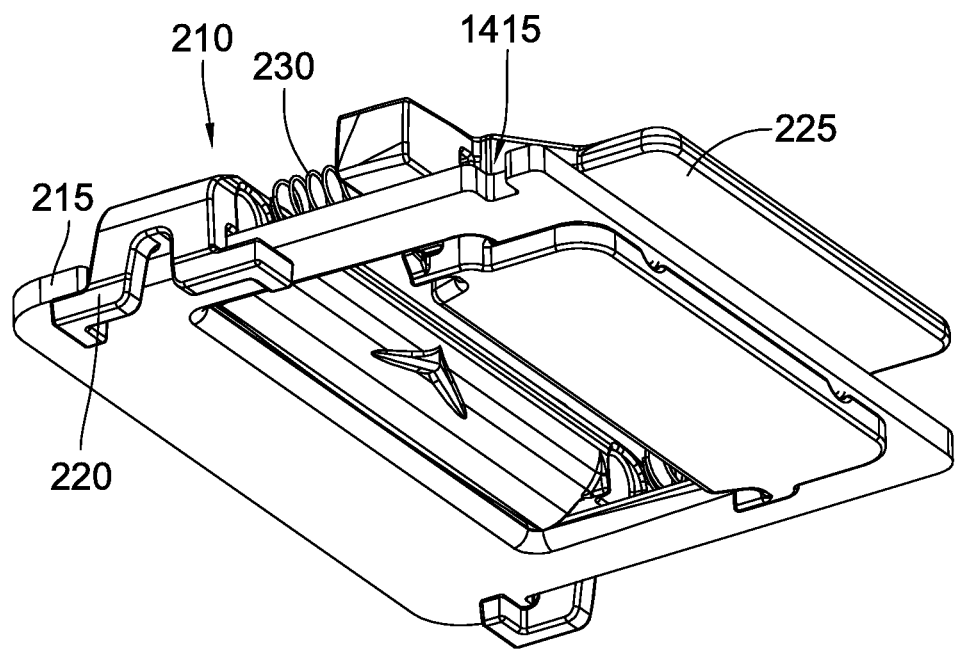
FIG. 16 is a bottom perspective view of the FIG. 15 lock adjuster assembly.

Referring now to FIGS. 14, 15, and 16, the frame 215 has a frame orientation guide 1405, and the web bar 220 has a web bar orientation guide 1410 that are used to properly align the web bar 220 on the frame 215 during assembly. In the illustrated example, the frame orientation guide 1405 and web bar orientation guide 1410 are stamped marks on the frame 215 and the web bar 220, but in other examples, the frame orientation guide 1405 and web bar orientation guide 1410 can include different types of markings such as stickers, ink marks, and the like. As should be appreciated, the frame orientation guide 1405 and web bar orientation guide 1410 allow an assembly line worker and/or a computerized vision system to readily recognize that both the frame orientation guide 1405 and web bar orientation guide 1410 should be located on the same side for proper orientation of the web bar 220 relative to the frame 215 during assembly. In another variation, having the frame orientation guide 1405 and the web bar orientation guide 1410 on opposite sides can indicate proper orientation of the web bar 220 relative to the frame 215 during assembly. As will be explained in greater detail below, the frame 215 further includes an orientation notch 1415 that ensures that the web bar 220 can only be properly secured to the frame 215 at the required orientation.

Figure 17:
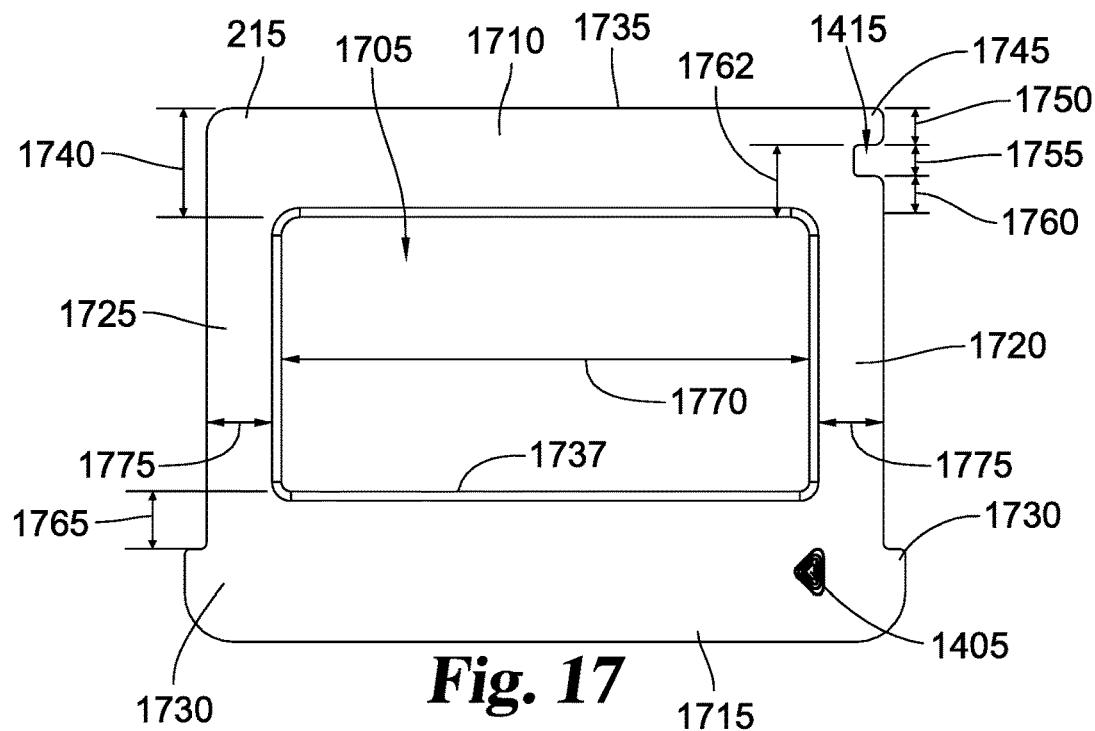
FIG. 17 is a top view of a frame in the FIG. 15 lock adjuster assembly.
Figure 18:
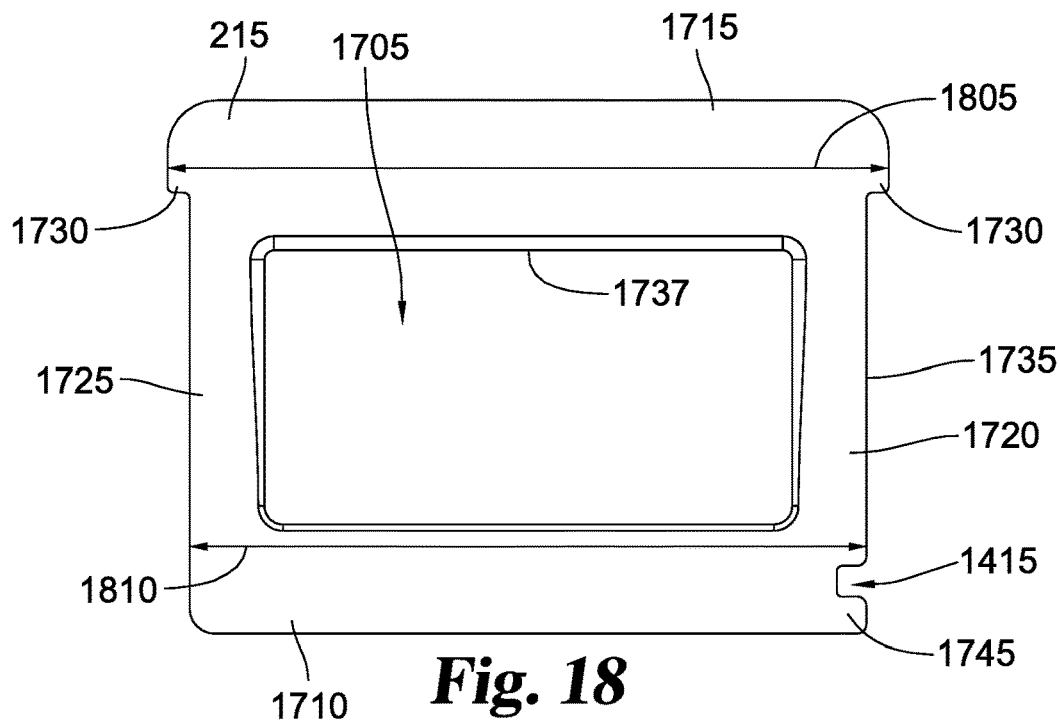
FIG. 18 is a bottom view of the FIG. 17 frame.
Figure 19:
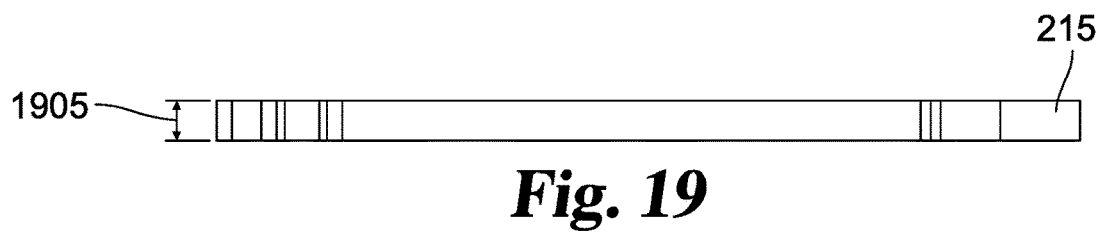
FIG. 19 is a side view of the FIG. 17 frame.

As shown in FIGS. 17, 18, and 19, the frame 215 has a web opening 1705 in which the tension web 110, fixed web 115, and indicator 225 are received. Around the web opening 1705, the frame 215 has an insertion rail 1710, a stop rail 1715, an alignment stile 1720, and a guide stile 1725. At the stop rail 1715, the frame 215 has one or more stop flanges 1730 configured to limit the movement of the web bar 220. The frame 215 further has a peripheral edge 1735 and an internal edge 1737 that surround the web opening 1705. As will be explained in greater detail below, the frame 215 and the web bar 220 have, along with their various structural features, specific dimensional relationships that inhibit the web bar 220 from being installed on the frame 215 at the wrong orientation. Among these dimensions, the insertion rail 1710 has an insertion rail width 1740 that is sized to inhibit improper installation of the web bar 220. The peripheral edge 1735 along the alignment stile 1720 has the orientation notch 1415 which defines an alignment tab 1745. The alignment tab 1745 has a tab width 1750, and the orientation notch 1415 has a notch width 1755, as is depicted in FIG. 17. As measured from the orientation notch 1415 to the internal edge 1737 of the web opening 1705, the insertion rail 1710 has a notch window distance 1760. Together, the notch width 1755 and notch window distance 1760 form a ledge clearance distance 1762. In the depicted example, the orientation notch 1415 is formed along the same side as the frame orientation guide 1405 so that the assembly line worker or robot only has to look at one side to confirm correct installation. Typically, but not always, the web bar 220 hits the end of the web opening 1705 just before the web bar 220 engages the stop flanges 1730, but in other examples, the web bar 220 can hit the stop flanges 1730 first. As shown, the stop flanges 1730 are positioned at a stop window distance 1765 from the proximal edge of the web opening 1705. The web opening 1705 has a window width 1770 that is at least as wide as the tension web 110, if not wider, to receive the tension web 110.

The frame 215 is structured so that the web bar 220 can be slid onto the frame 215 from one end. Specifically, the stop rail 1715 is sized to prevent the web bar 220 from being slid onto the stop rail 1715 of the frame 215. As measured from the ends of the stop flanges 1730, the stop rail 1715 has a stop rail width 1805. It should be recognized that the stop rail width 1805 is sized large enough such that the web bar 220 is unable to be slid onto the stop rail 1715 of the frame 215. At the other end, the insertion rail 1710 has an insertion end width 1810 as measured from the peripheral edge 1735 of the alignment stile 1720 and guide stile 1725 that allows the web bar 220 to be slid onto the frame 215. As illustrated in FIG. 19, the frame 215 has a frame thickness 1905 that is sized to facilitate the web bar 220 being installed in the proper orientation. Both the alignment stile 1720 and guide stile 1725 have a stile width 1775 as measured from the peripheral edge 1735 of the frame 215 to the web opening 1705. In the illustrated example, the stile width 1775 of the alignment stile 1720 and guide stile 1725 are the same, but in other examples, the stile width 1775 of the alignment stile 1720 and guide stile 1725 can be different.

Figure 20:
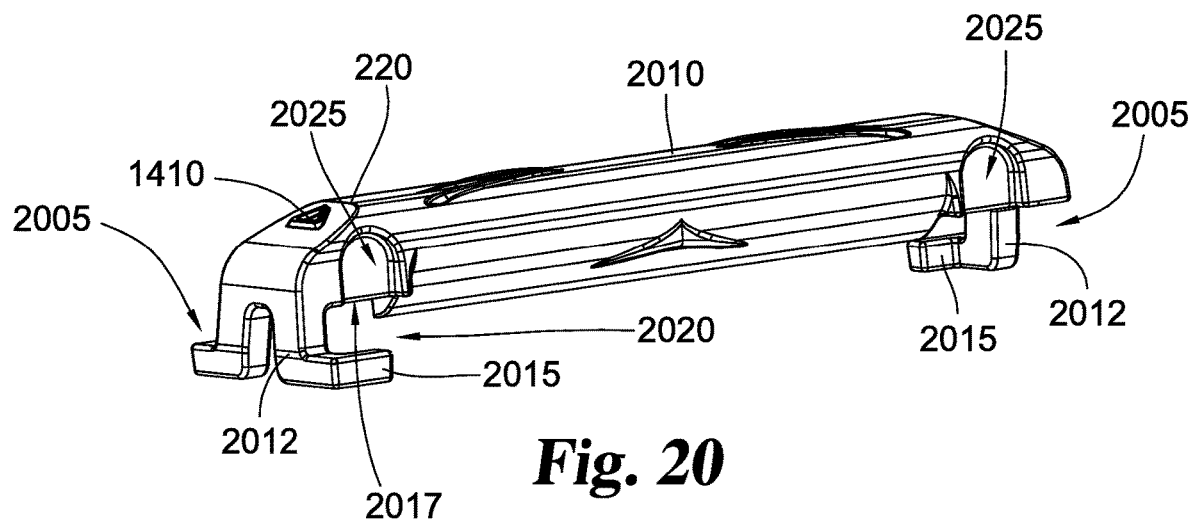
FIG. 20 is a top perspective view of a web bar in the FIG. 15 lock adjuster assembly.
Figure 21:
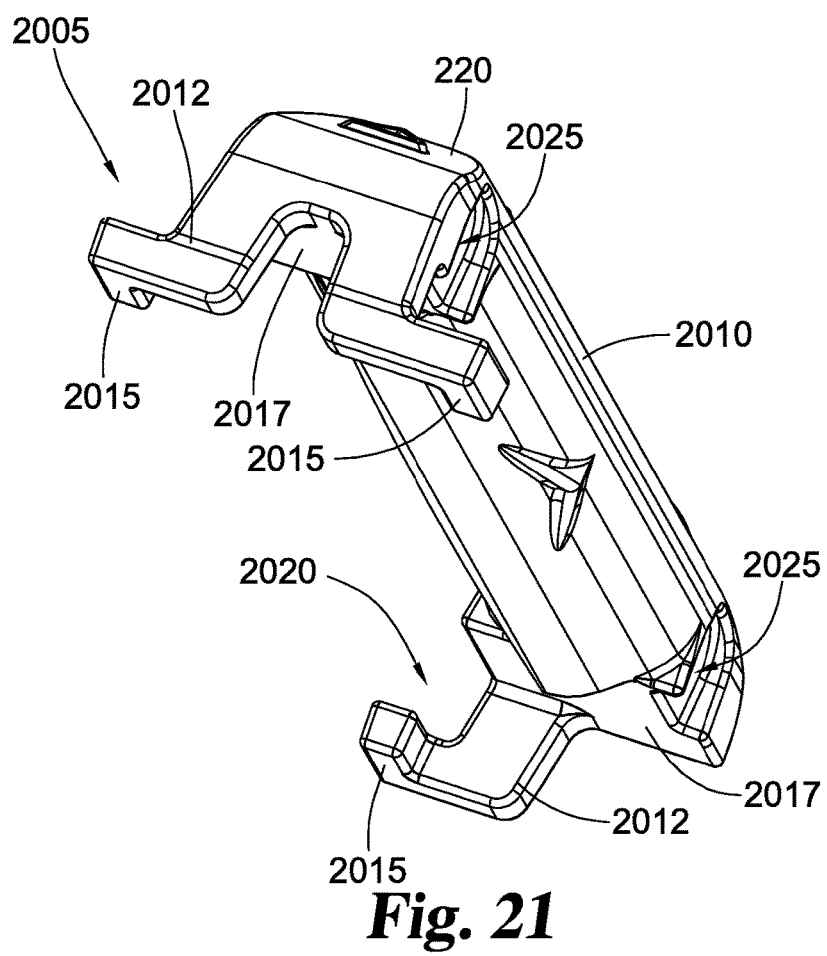
FIG. 21 is a bottom perspective view of the FIG. 20 web bar.

Looking at FIGS. 20 and 21, the web bar 220 includes a frame guide 2005 configured to retain the web bar 220 on the frame 215 as the web bar 220 slides along the frame 215, and the web bar 220 also has a bar 2010 around which the tension web 110 is looped. The frame guide 2005 has an asymmetric shape that facilitates the web bar 220 being attached to the frame 215 in only one orientation. In the illustrated example, the frame guide 2005 has one or more frame guide legs 2012 with one or more frame guide feet 2015 positioned on opposing ends of the bar 2010 and extending towards one another. In the depicted example, the frame guide legs 2012 are L-shaped, and the frame guide legs 2012 connect the bar 2010 to the frame guide feet 2015. The frame guide feet 2015 hook underneath the alignment stile 1720 and guide stile 1725 to retain the web bar 220 on the frame 215 in a sliding manner. In the illustrated example, the frame guide 2005 is asymmetric in that the frame guide 2005 has three (3) frame guide feet 2015, that is, two (2) on one side and one (1) on the other side, but in other examples, the frame guide 2005 can be asymmetric in other manners such as by having a different number of frame guide feet 2015 (or frame guide legs 2012) and/or by having the frame guide feet 2015 shaped differently. Generally speaking, the frame guide feet 2015 of the frame guide 2005 form a key that allows the web bar 220 to be solidly seated on the frame 215 in only a single way.

At each end of the bar 2010 proximal the frame guide legs 2012, the frame guide feet 2015 along with a corresponding stile engaging surface 2017 of the bar 2010 form one or more frame stile slots 2020 in which the alignment stile 1720 and guide stile 1725 are slidably received. In the illustrated example, the stile engaging surface 2017 is generally flat to promote smooth sliding of the web bar 220. Above the frame stile slots 2020, the bar 2010 has one or more spring seat cavities 2025 in which the web bar springs 230 are seated. When the web bar 220 is installed in the adjuster indicator assembly 210, the spring seat cavities 2025 face the indicator 225 so that the web bar springs 230 are positioned between the web bar 220 and indicator 225. In the illustrated example, the web bar 220 has two spring seat cavities 2025 positioned at opposite ends of the bar 2010 proximal to the frame guide feet 2015 so as to coincide with the pair of web bar springs 230. With the web bar springs 230 and spring seat cavities 2025 configured in such a way, an even resilient force is applied to the web bar 220 so as to avoid the web bar 220 being crooked relative to the frame 215. If the web bar 220 were crooked, the tension web 110 might not be secured or released properly, and the tension web 110 may become damaged. When the tension web 110 is secured, the frame guide legs 2012 facing the stop flanges 1730 are able to hook underneath the stop flanges 1730 of the frame 215 so as to further bolster support of the web bar 220 by minimizing rotation of the web bar 220 when further tension is applied to the tension web 110. As for example shown in FIGS. 16, 17, and 18, the side of the frame guide feet 2015 having two of the frame guide feet 2015 faces the stop flanges 1730 so that the frame guide legs 2012 that are L-shaped are able to hook underneath the stop flanges 1730. In other words, the side of the web bar 220 with the two (2) frame guide legs 2012 and frame guide feet 2015 face away from the indicator 225 when assembled, and as such, extend opposite the spring seat cavities 2025.

As mentioned before, traditional web bars are typically flat because they are manufactured using a stamping process that limits the geometry of the web bars. Among other things, this limited geometry impacts how strongly the web is secured during tension. The web bar 220 in the illustrated example is made from a casting process. This casting process allows web bar 220 to have a more complicated geometry that facilitates better clamping, sliding, and releasing of the tension web 110 between the web bar 220 and frame 215 as well as allows the web bar 220 to have an asymmetric shape of the type explained before. In one particular form, the web bar 220 is manufactured using a cast zinc process, but the web bar 220 can be cast from other materials such as steel. For instance, in another variation, the web bar 220 is manufactured using a metalized 3D printing technique.

Figure 22:
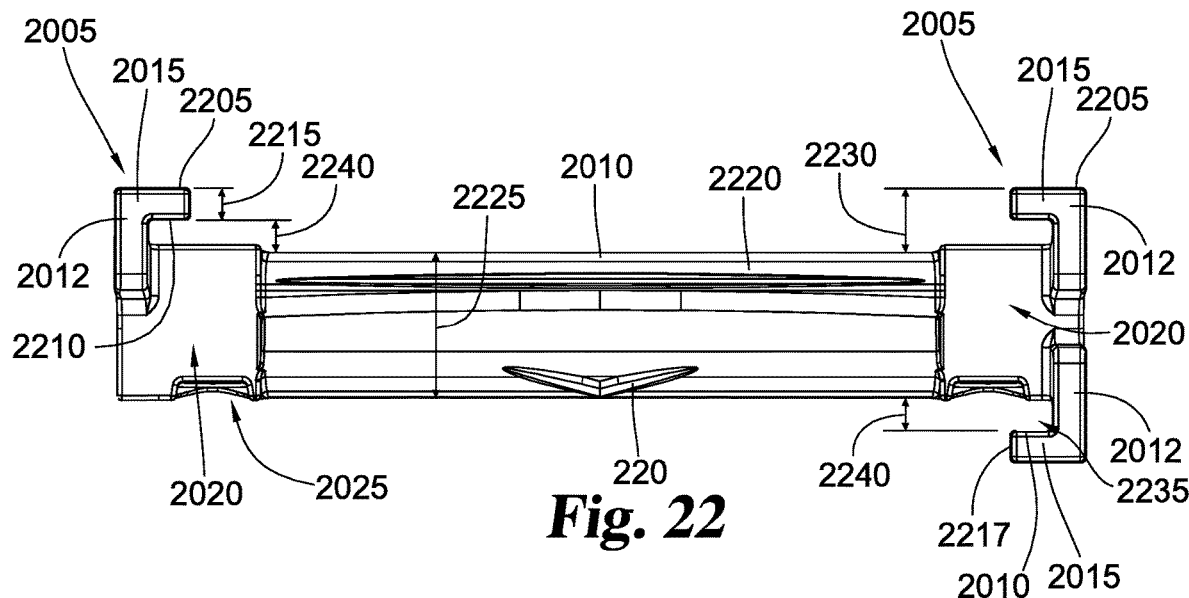
FIG. 22 is a bottom view of the FIG. 20 web bar.
Figure 23:
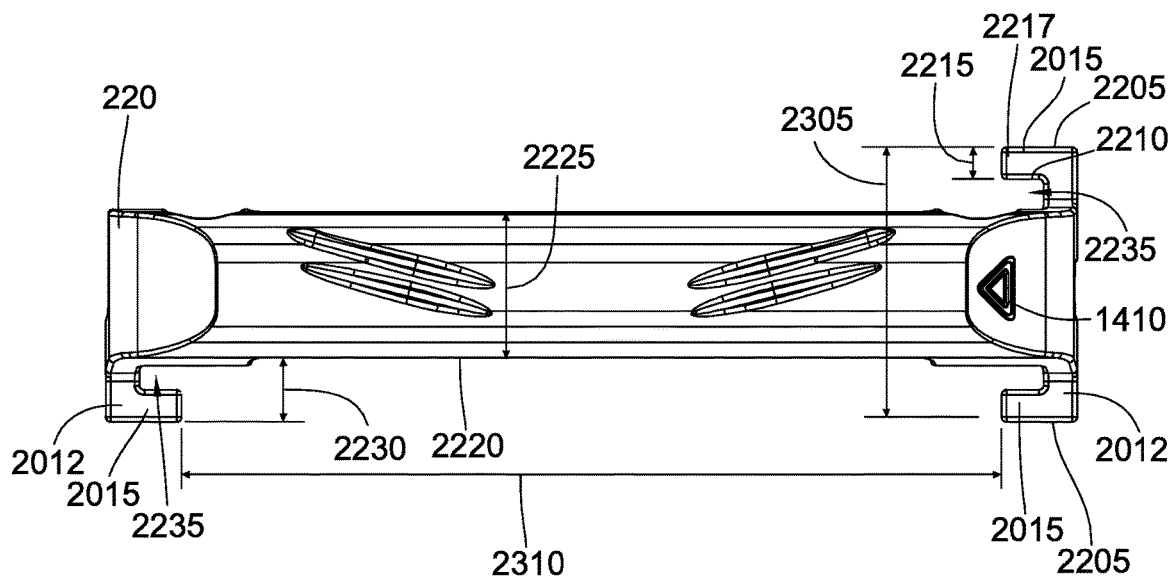
FIG. 23 is a top view of the FIG. 20 web bar.

Turning now to FIGS. 22 and 23, each of the frame guide feet 2015 has an exterior surface 2205 and an interior surface 2210. As measured between the exterior surface 2205 and interior surface 2210, each of the frame guide feet 2015 has a foot guide width 2215. Opposite the end of the bar 2010 without one of the frame guide legs 2012, the frame guide feet 2015 include a key guide foot 2217 that is configured to slide through the orientation notch 1415 in the frame 215 during proper assembly. At least the foot guide width 2215 of the key guide foot 2217 is no more than the notch width 1755 of the orientation notch 1415 in the frame 215 (FIG. 17) so that key guide foot 2217 is able to slide through the orientation notch 1415. In one form, the foot guide width 2215 of the key guide foot 2217 is less than the notch width 1755 of the orientation notch 1415 in the frame 215. The bar 2010 has a bar exterior surface 2220, and the interior surface 2210 has a bar width 2225 as measured at the widest part of the bar exterior surface 2220. In one form, the bar width 2225 is generally similar to or the same as the insertion rail width 1740 of the insertion rail 1710 in the frame 215. For each of the frame guide feet 2015, a leg extension distance 2230 is measured from the bar exterior surface 2220 of the bar 2010 to the exterior surface 2205. Between the interior surface 2210 of each of the frame guide feet 2015 and the bar exterior surface 2220, the web bar 220 has a guide foot gap 2235 with a guide foot gap width 2240. As illustrated in FIG. 23, the two frame guide feet 2015 on the same side form the frame guide width 2305 that represents the widest portion of the frame guide 2005. The ends of the frame guide feet 2015 on the same side are spaced apart by a feet tip distance 2310. In one example, the feet tip distance 2310 of the frame guide feet 2015 is less than the insertion end width 1810 of the frame 215 such that the web bar 220 is retained on the frame 215 during and after assembly. The feet tip distance 2310 between the frame guide feet 2015 also ensures that the web bar 220 is attached to the indicator section 915 at the proper orientation. The frame guide feet 2015 in the web bar 220 shown in the illustrated example have the same dimensions, but in other examples, some or all of the dimensions between two or more of the frame guide feet 2015 are different. For example, the foot guide width 2215 of the key guide foot 2217 can be smaller than the notch width 1755 of the orientation notch 1415 in the frame 215, but the rest of the frame guide feet 2015 can have a foot guide width 2215 that is wider than the notch width 1755 of the orientation notch 1415.

Figure 24:
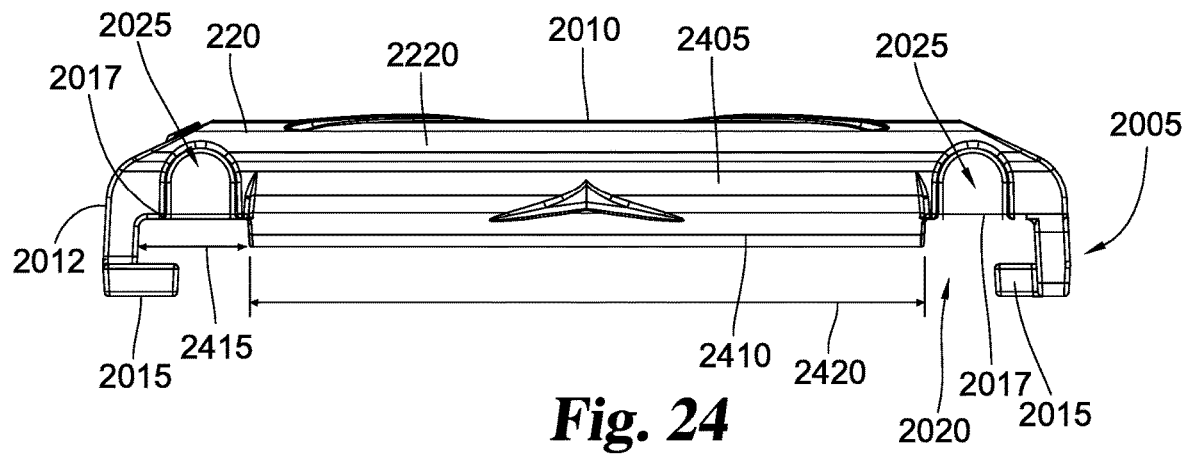
FIG. 24 is a rear view of the FIG. 20 web bar.
Figure 25:
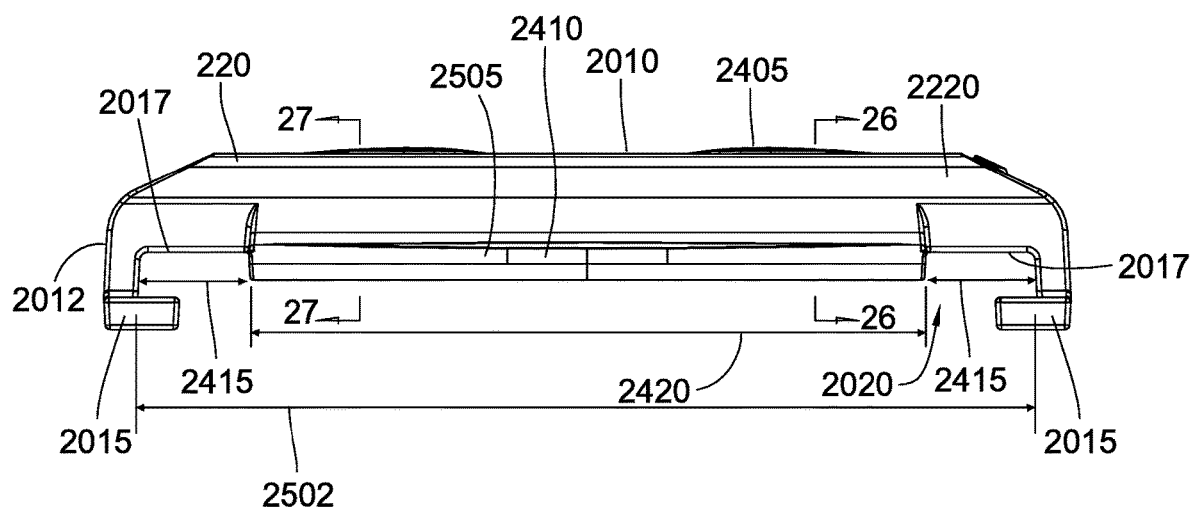
FIG. 25 is a front view of the FIG. 20 web bar.

As illustrated in FIGS. 24 and 25, the bar 2010 has a web guide surface 2405 around which the tension web 110 slides. The bar 2010 further has a frame engagement ledge 2410 that extends below the stile engaging surface 2017 so as to engage the frame 215. The frame stile slots 2020 each has a stile slot width 2415 that is sized to receive the alignment stile 1720 or guide stile 1725 of the indicator section 915. In one form, the stile slot width 2415 of the web bar 220 is larger than the stile width 1775 of the of the frame 215 to promote sliding. The frame engagement ledge 2410 of the web bar 220 is sized to extend into the web opening 1705 of the frame 215. In the illustrated example, the frame engagement ledge 2410 has a ledge width 2420 that is smaller than the window width 1770 of the web opening 1705 so that the frame engagement ledge 2410 is able to smoothly move within the web opening 1705 of the frame 215. In one particular form, the ledge width 2420 is just slightly smaller than the web opening 1705. Altogether the stile slot width 2415 and ledge width 2420 form an inner web bar width 2502. The inner web bar width 2502 in one form is less than the stop rail width 1805 of the frame 215, but the inner web bar width 2502 is at least slightly larger than the insertion end width 1810 of the frame 215 (FIG. 18). Once more, this dimensional relationship ensures that the web bar 220 is slid onto the frame 215 from only the end at the insertion rail 1710.

Figure 26:
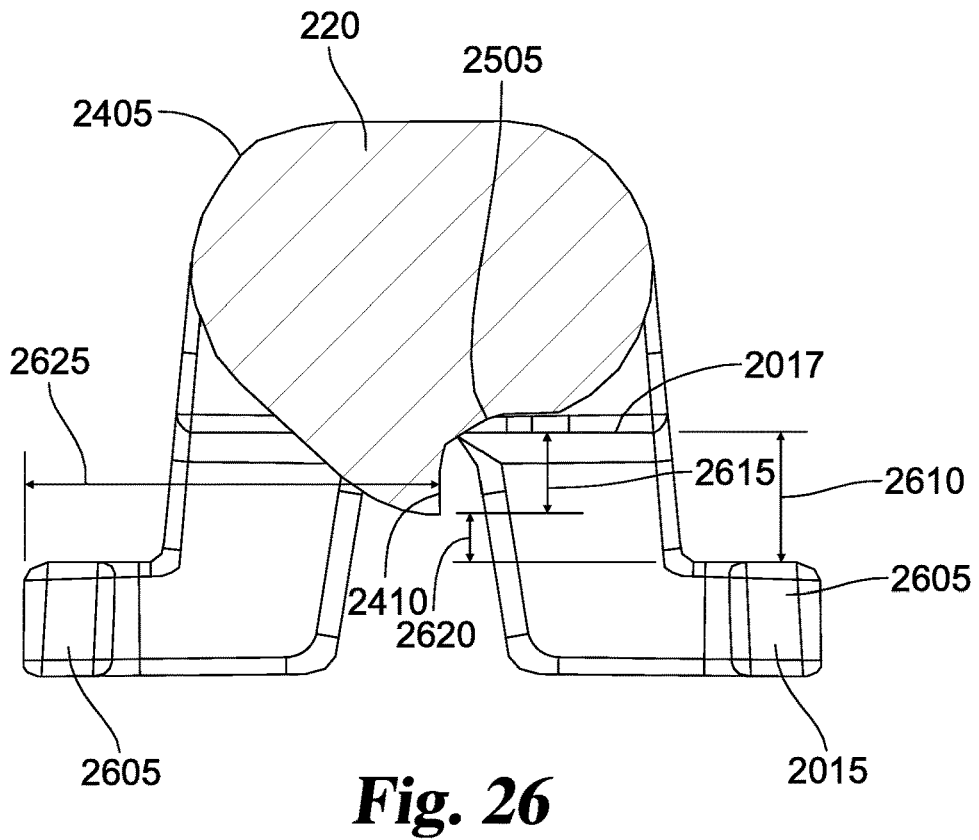
FIG. 26 is a cross-sectional view of the FIG. 20 web bar as taken along line 26-26 in FIG. 25.
Figure 27:
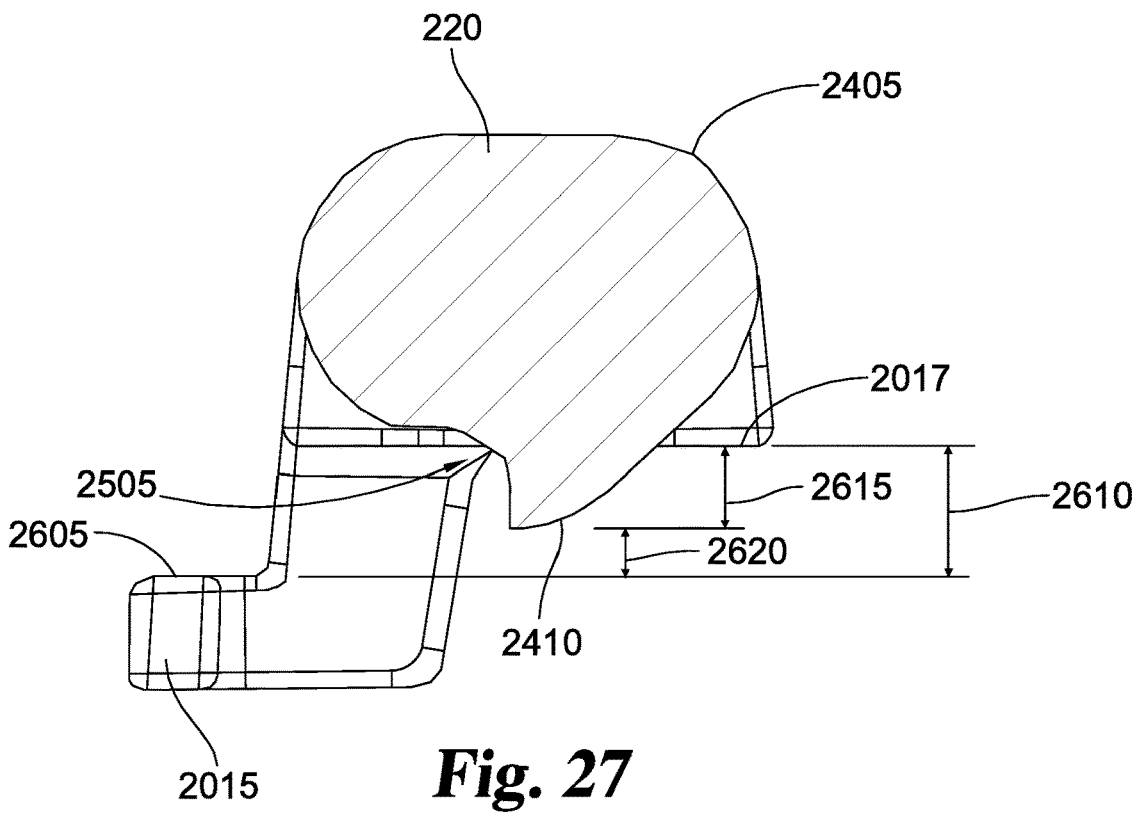
FIG. 27 is a cross-sectional view of the FIG. 20 web bar as taken along line 27-27 in FIG. 25.
Figure 28:
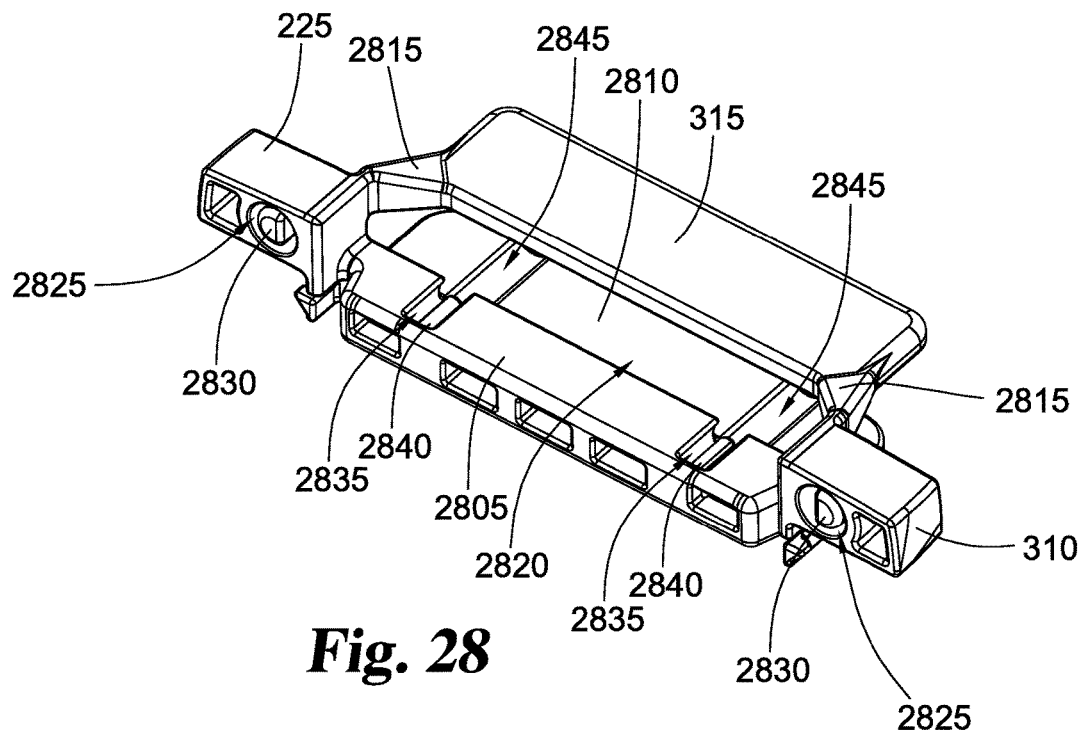
FIG. 28 is a top perspective view of an indicator in the FIG. 15 lock adjuster assembly.
Figure 29:
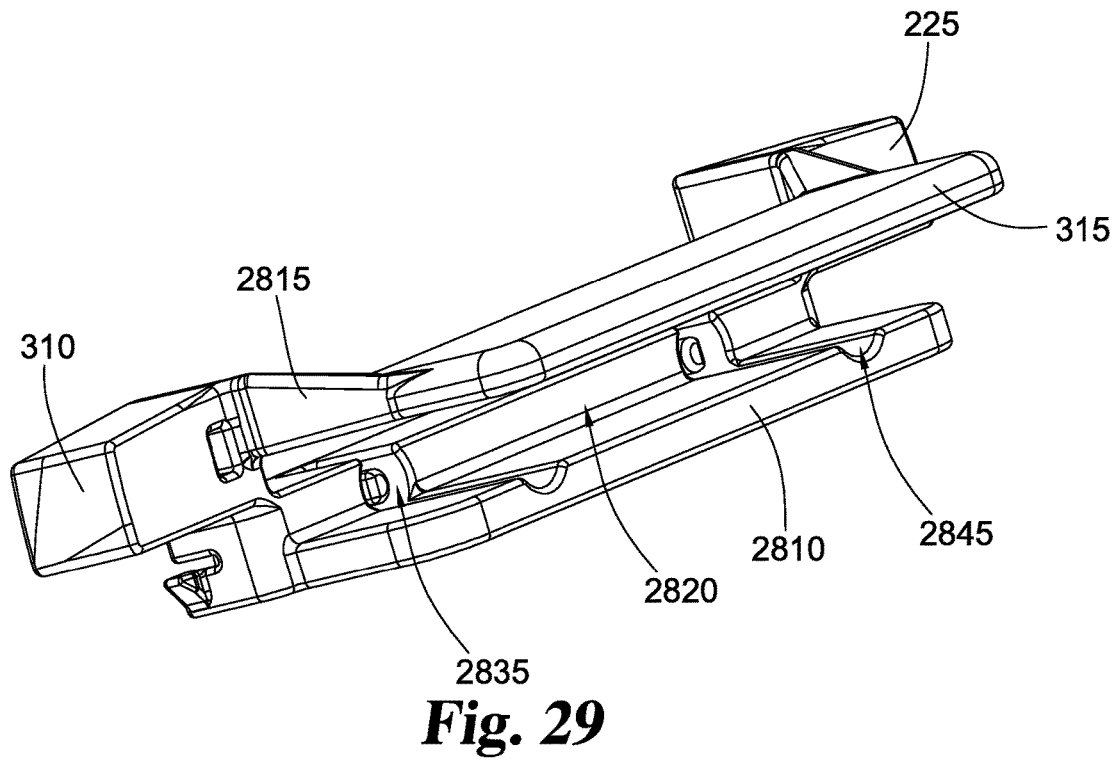
FIG. 29 is a front perspective view of the FIG. 28 indicator.
Figure 30:
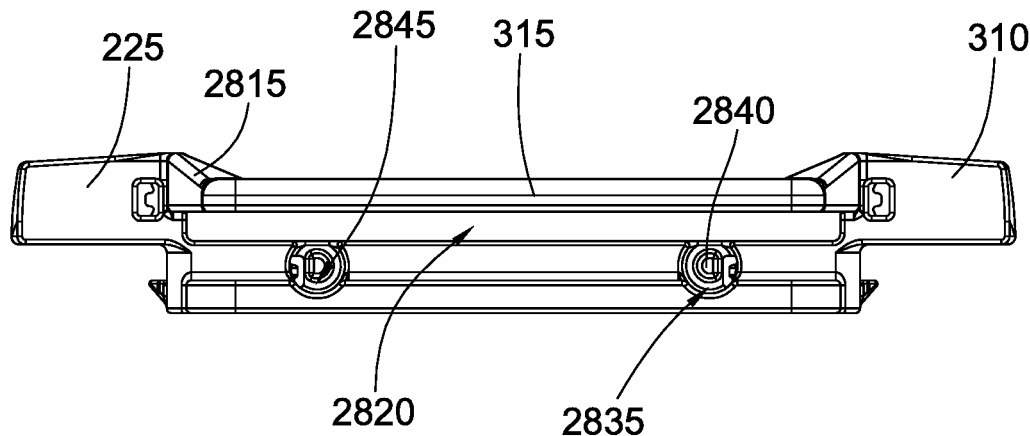
FIG. 30 is a front view of the FIG. 28 indicator.
Figure 31:
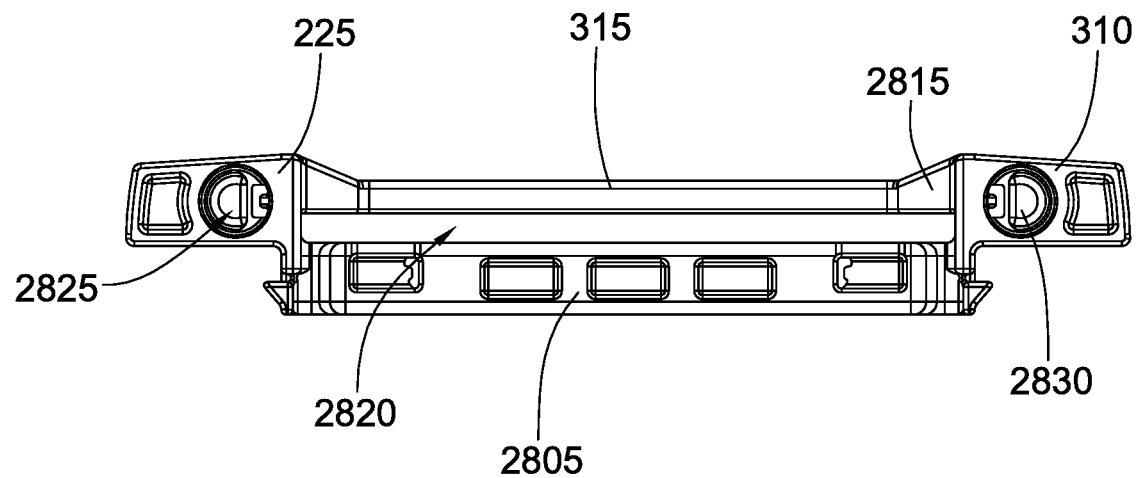
FIG. 31 is a rear view of the FIG. 28 indicator.
Figure 32:
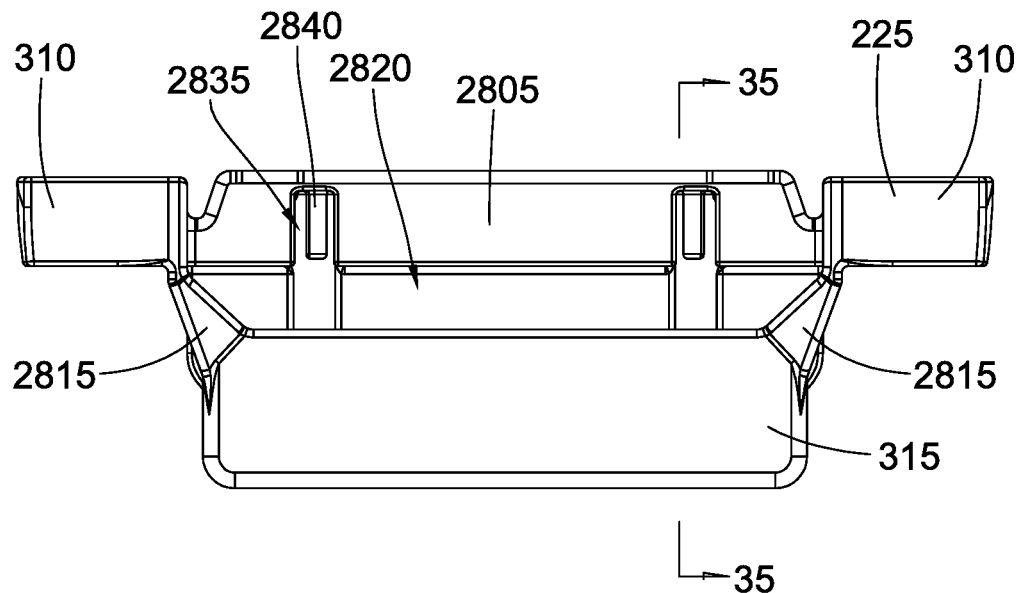
FIG. 32 is a top view of the FIG. 28 indicator.
Figure 33:
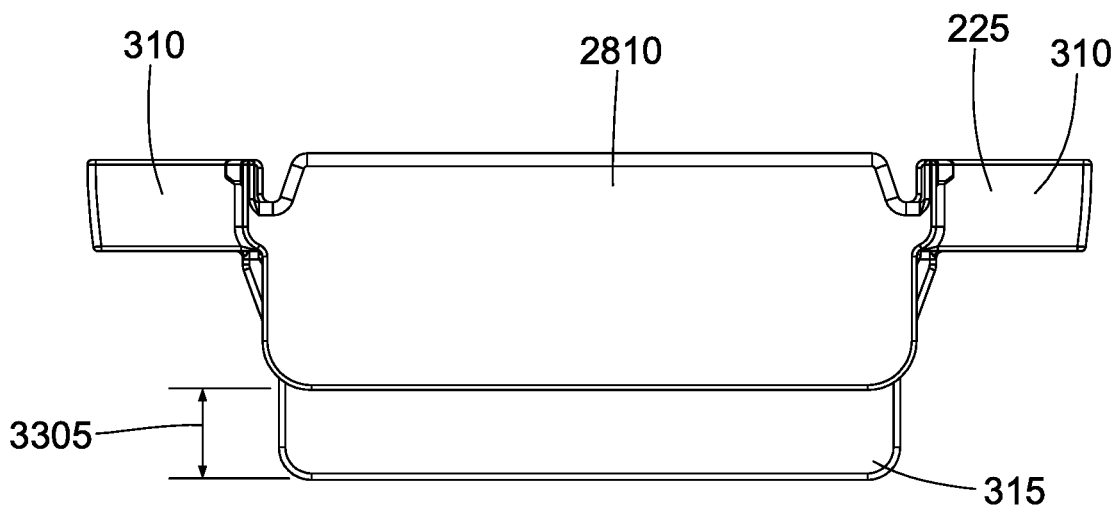
FIG. 33 is a bottom view of the FIG. 28 indicator.

Looking at FIGS. 25, 26, and 27, the frame engagement ledge 2410 of the web bar 220 has a web engagement notch 2505 that is concavely or hook shaped to firmly secure the tension web 110 against the internal edge 1737 of the frame 215. The web engagement notch 2505 is able to wrap around the internal edge 1737 in the web opening 1705 which creates a tight grip with the tension web 110. As noted before, the web bar 220 in one example is manufactured using a casting process that allows the web engagement notch 2505 with the hook shape to be readily formed. Each of the frame guide feet 2015 has a stile facing surface 2605 that defines a stile slot height 2610 between the frame guide feet 2015 and stile engaging surface 2017. The stile slot height 2610 is at least slightly larger than the frame thickness 1905 of the frame 215 (FIG. 19) so that the web bar 220 is able to slide along the frame 215. Within the stile slot height 2610, the frame engagement ledge 2410 extends past the stile engaging surface 2017 by a ledge height 2615, and the end of the frame engagement ledge 2410 is spaced from the stile facing surface 2605 of the frame guide feet 2015 by a guide gap height 2620. In the illustrated example, the guide gap height 2620 is less than the frame thickness 1905 of the frame 215. When the web bar 220 is slid onto the insertion rail 1710 of the frame 215, the frame engagement ledge 2410 acts as a stop to inhibit further sliding of the web bar 220. As shown in FIG. 26, the frame guide feet 2015 is spaced from the frame engagement ledge 2410 by a feet ledge distance 2625. In one form, the feet ledge distance 2625 is at least the ledge clearance distance 1762 on the frame 215 (FIG. 17) such that the frame engagement ledge 2410 is able to be received in the web opening 1705 of the frame 215 during assembly. As will be explained in further detail below, the web bar 220 then has to be rotated until the key guide foot 2217 reaches the orientation notch 1415 in the frame 215. At that point, the frame engagement ledge 2410 of the web bar 220 is positioned at the web opening 1705 in the frame 215. The web bar 220 is then able to be rotated such that the key guide foot 2217 slides through the orientation notch 1415 and hooks under the frame 215. From there, the web bar 220 continues to slide along the frame 215 during assembly with the web bar 220 slidably secured to the frame 215.

As mentioned before, the indicator 225 includes the longitudinal tension indicator 315 located between the lateral tension indicators 310. Referring to FIGS. 28, 29, 30, and 31, the indicator 225 further includes an indicator body 2805 that extends between the lateral tension indicators 310. An indicator guide flange 2810 extends from the indicator body 2805 generally parallel to the longitudinal tension indicator 315. As shown, one or more indicator connection legs 2815 are angled from the lateral tension indicators 310 towards the longitudinal tension indicator 315 so as to connect the lateral tension indicators 310 to the longitudinal tension indicator 315. The longitudinal tension indicator 315 extends past the indicator guide flange 2810 such that the indicator guide flange 2810 is recessed relative to the longitudinal tension indicator 315. With the indicator guide flange 2810 recessed, the indicator guide flange 2810 is able to be inserted through the web opening 1705 in the frame 215. At the same time, the lateral tension indicators 310 and longitudinal tension indicator 315 help to retain the indicator 225 at the proper position relative to the frame 215 during assembly. A web guide channel 2820 through which the fixed web 115 extends is formed between longitudinal tension indicator 315 and the indicator body 2805 as well as the indicator guide flange 2810. The lateral tension indicators 310 have one or more web bar spring seat cavities 2825 with web bar spring pins 2830 to which the web bar springs 230 are secured. The indicator body 2805 has one or more indicator spring seat cavities 2835 with indicator spring pins 2840 to which the indicator springs 235 are secured. The indicator guide flange 2810 has one or more indicator spring grooves 2845 that are aligned with the indicator spring seat cavities 2835 to retain the indicator springs 235.

Figure 34:
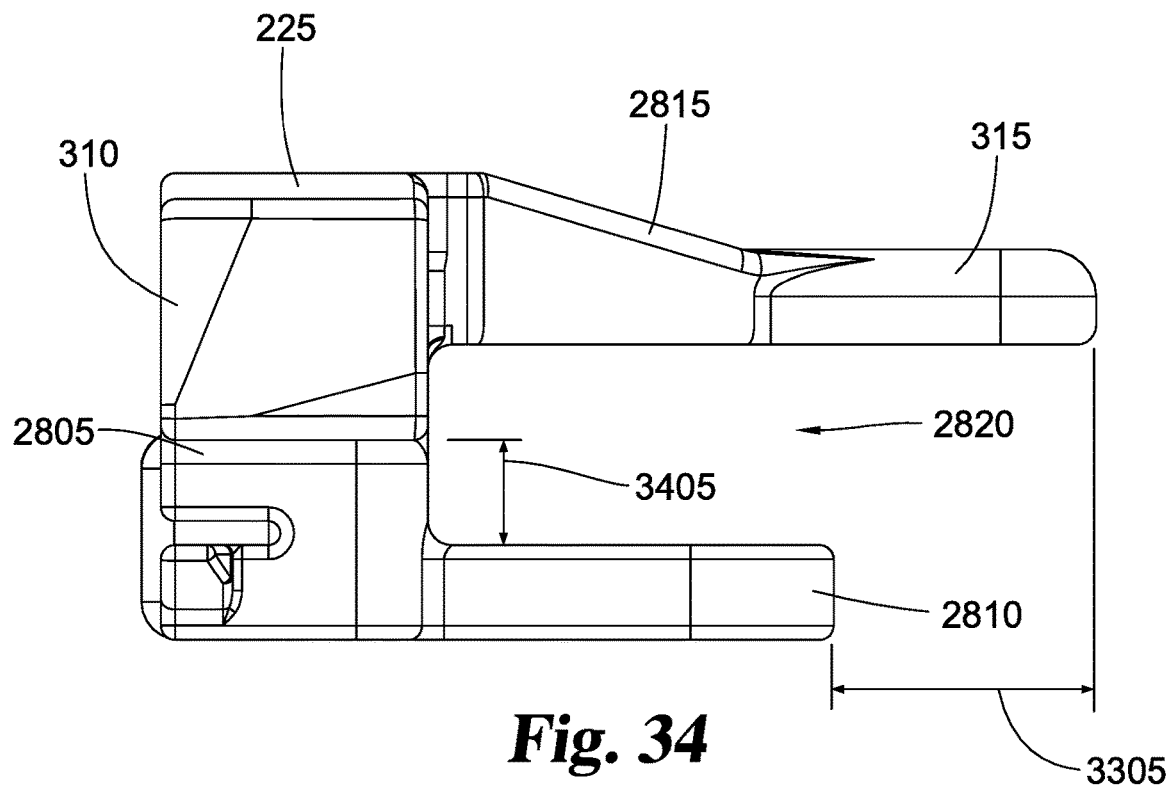
FIG. 34 is a side view of the FIG. 28 indicator.
Figure 35:
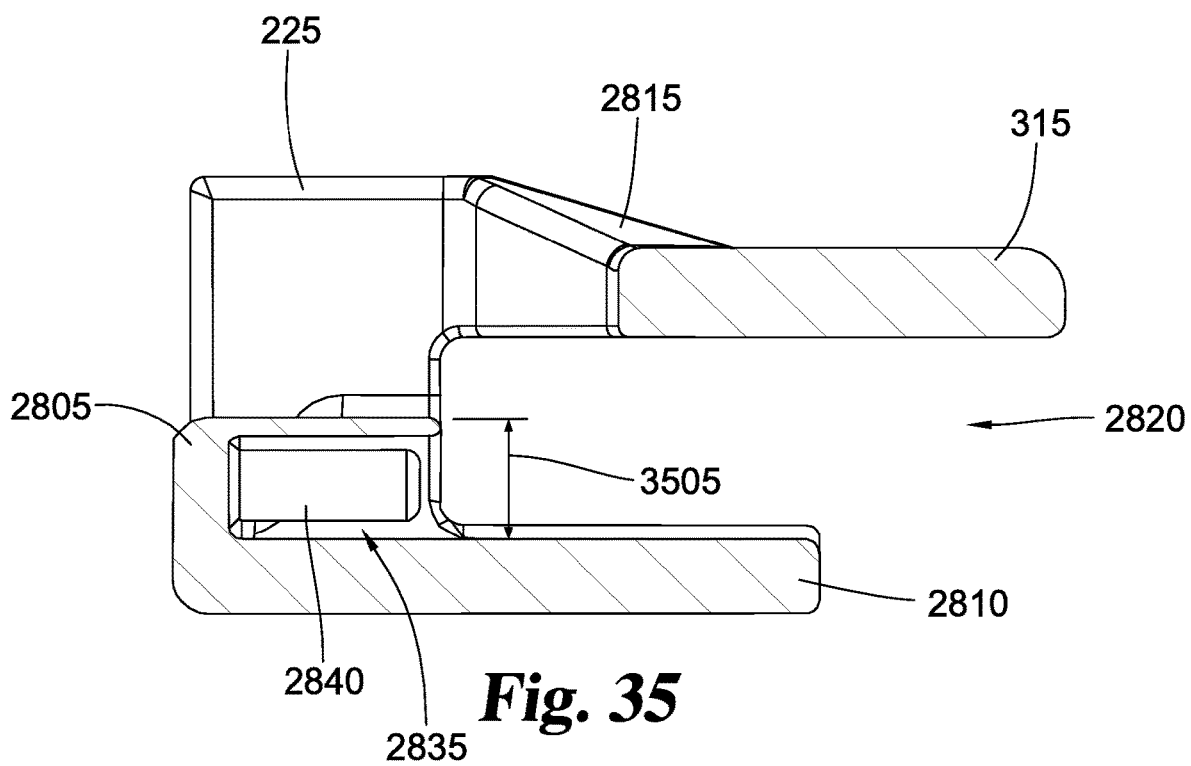
FIG. 35 is a cross-sectional view of the FIG. 28 indicator as taken along line 35-35 in FIG. 32.

As noted before, the indicator guide flange 2810 is recessed relative to the longitudinal tension indicator 315 such that the indicator guide flange 2810 is able to be fitted through the web opening 1705 during assembly while at the same time the longitudinal tension indicator 315 is long enough to retain the indicator 225 when the web bar 220 is installed. Looking at FIGS. 32, 33, 34, and 35, the indicator guide flange 2810 is recessed relative to the longitudinal tension indicator 315 by a recessed distance 3305. The lateral tension indicators 310 are raised from the indicator guide flange 2810 by a lateral indicator height 3405, as is indicated in FIG. 34. The indicator body 2805 in FIG. 35 is raised from the indicator guide flange 2810 by a frame edge engagement height 3505. The lateral indicator height 3405 of the lateral tension indicators 310 and the frame edge engagement height 3505 of the indicator body 2805 are generally the same and generally correspond to the frame thickness 1905 of the frame 215 (FIG. 19). With such dimensions, the indicator spring seat cavities 2835 are generally aligned with the internal edge 1737 of the frame 215 (FIG. 17) such that the indicator springs 235 are positioned for compression between the indicator body 2805 and the internal edge 1737 of the frame 215.

Figure 36:
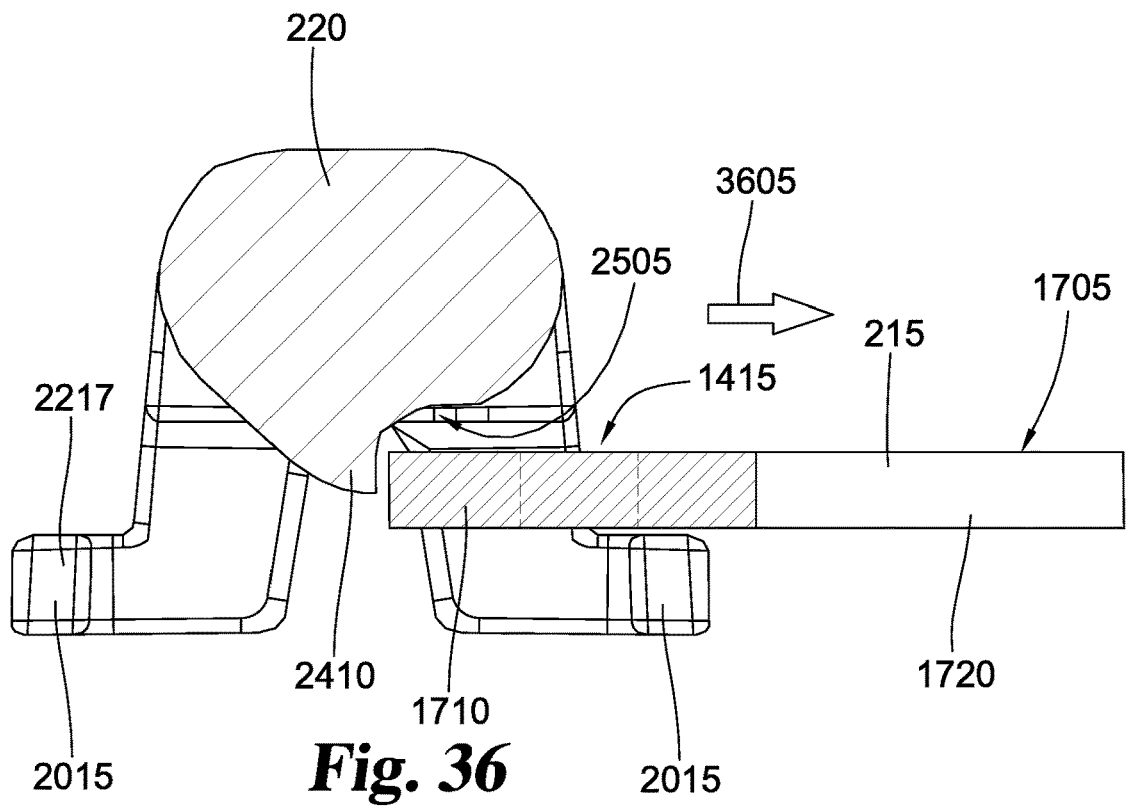
FIG. 36 is a partial cross-sectional view of during insertion of the FIG. 20 web bar on the FIG. 17 frame.
Figure 37:
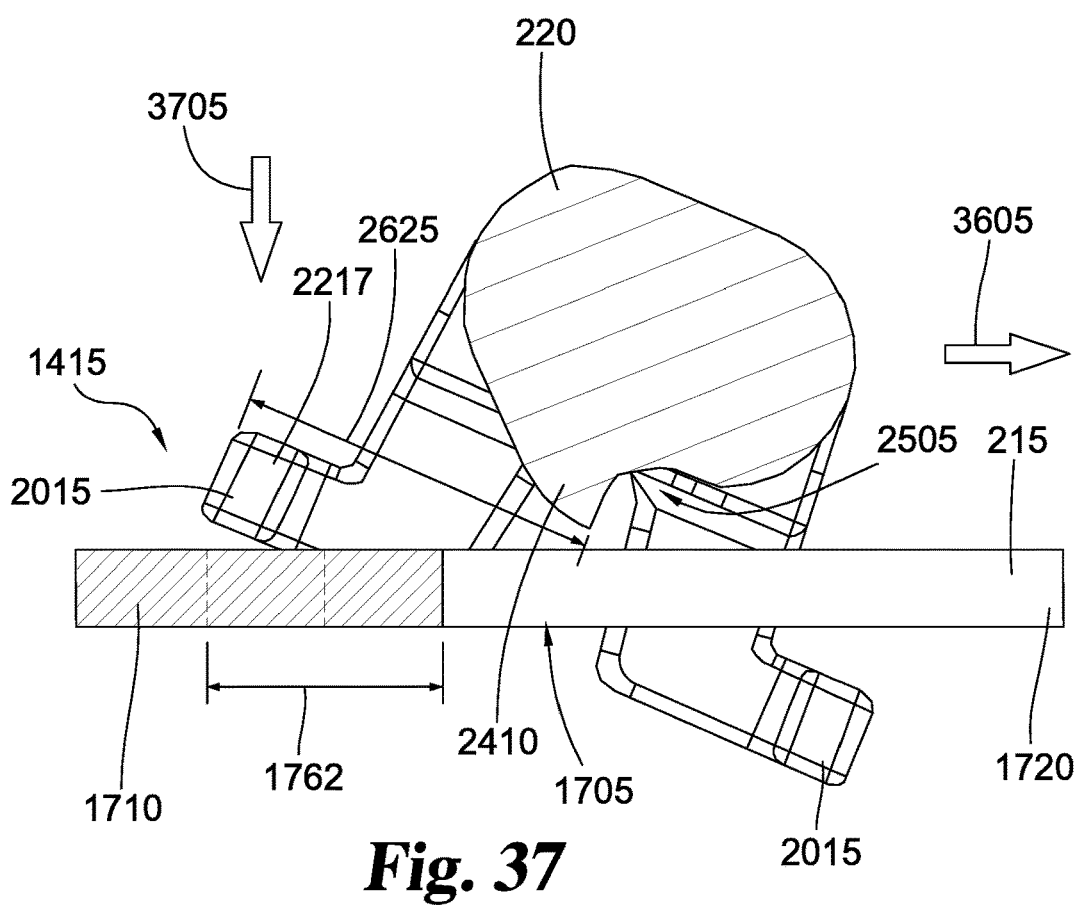
FIG. 37 is a partial cross-sectional view of during seating of the FIG. 20 web bar on the FIG. 17 frame.
Figure 38:
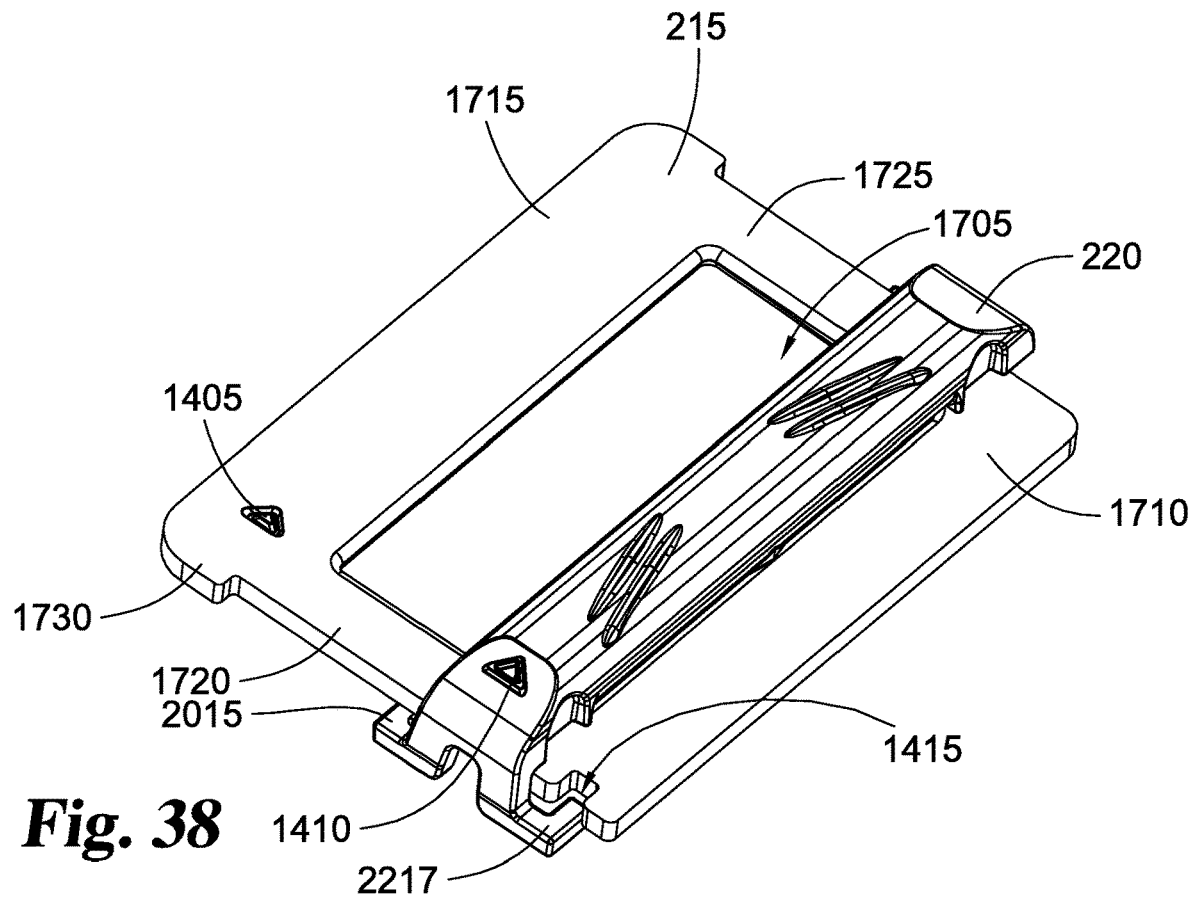
FIG. 38 is a top perspective view of the FIG. 20 web bar seated on the FIG. 17 frame.

A technique for assembling the tilt-lock adjuster system 100 will initially be described with reference to FIGS. 36, 37, 38, 39, and 40. As described before, the frame 215 and web bar 220 utilize a unique keying arrangement that ensures proper assembly of the tilt-lock adjuster 105. During assembly, the frame orientation guide 1405 on the frame 215 and the web bar orientation guide 1410 on the web bar 220 (FIG. 14) are positioned on the same side so that the frame 215 and web bar 220 are properly aligned. As depicted by arrow 3605 in FIG. 36, the web bar 220 is then slid onto the insertion rail 1710 of the frame 215 with the two opposing frame guide feet 2015 engaged underneath the frame 215. As mentioned before, the frame 215 and web bar 220 are dimensioned so that the web bar 220 can be slid or attached to the frame 215 in only one way. Referring to FIGS. 26 and 36, the guide gap height 2620 of the frame engagement ledge 2410 is smaller than the frame thickness 1905 (FIG. 19) of the frame 215 such that as the web bar 220 continues to slide onto the frame 215, and the frame engagement ledge 2410 eventually hits the insertion rail 1710 so that the frame engagement ledge 2410 prevents the web bar 220 from completely sliding onto the frame 215. The assembler or automated system then has to rotate the web bar 220 such that the key guide foot 2217 rides on top of the frame 215. Once the key guide foot 2217 reaches the orientation notch 1415, as is indicated by the dashed lines in FIG. 37, the frame engagement ledge 2410 has cleared the insertion rail 1710 such that the frame engagement ledge 2410 is then able to be received in the web opening 1705. Looking at FIGS. 37 and 38, the key guide foot 2217 is inserted through the orientation notch 1415 in the direction as indicated by arrow 3705. As mentioned before, the feet ledge distance 2625 of the key guide foot 2217 is greater than or equal to the ledge clearance distance 1762 on the frame 215 (FIG. 17) such that the frame engagement ledge 2410 is able to be received in the web opening 1705 of the frame 215 during assembly.

Figure 39:
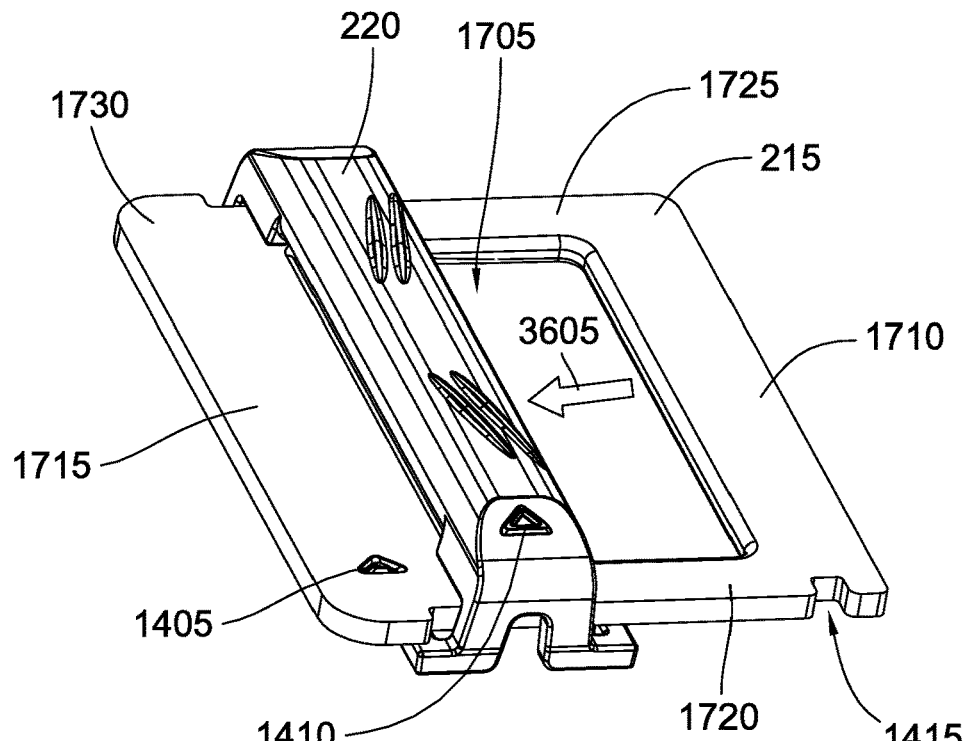
FIG. 39 is a top perspective view of during mounting of the FIG. 20 web bar on the FIG. 17 frame.
Figure 40:
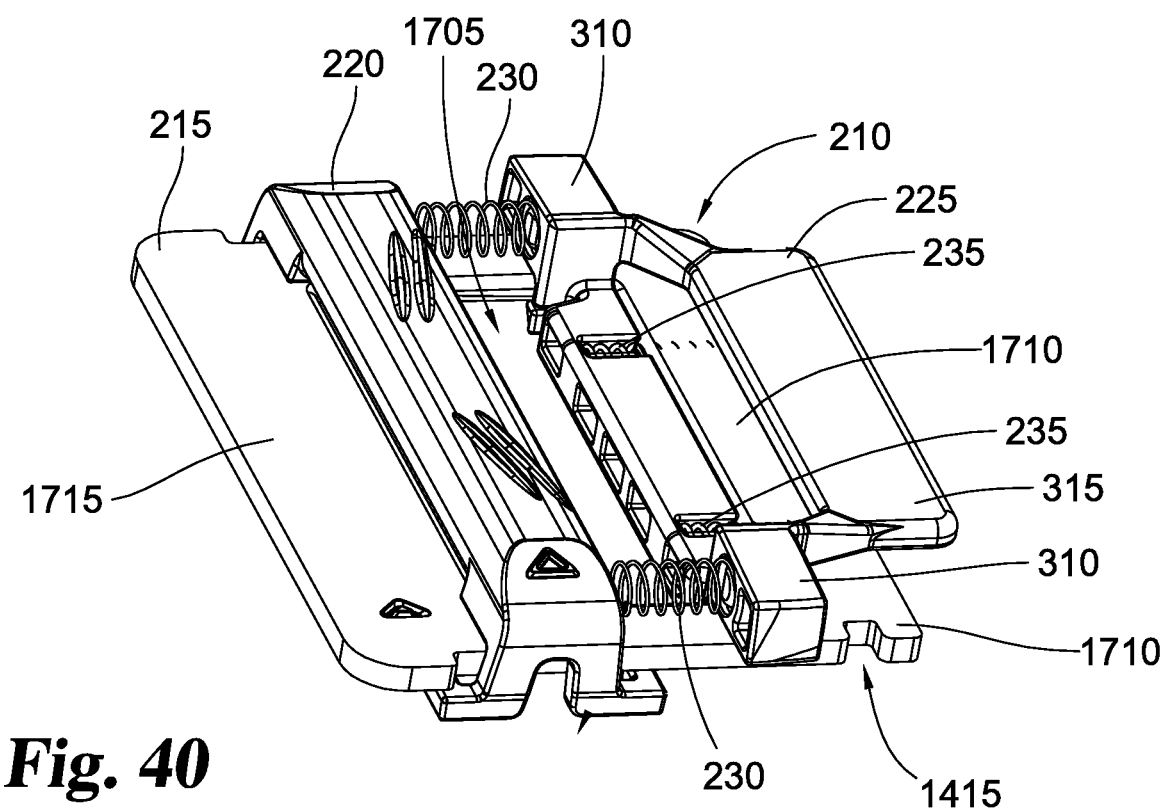
FIG. 40 is a top perspective view of during mounting of the FIG. 28 indicator on the FIG. 17 frame.

Once the key guide foot 2217 is inserted through the orientation notch 1415 in the frame 215, the web bar 220 slides along the alignment stile 1720 and guide stile 1725 in the direction indicated by arrow 3605 in FIG. 39 towards the stop rail 1715. The web engagement notch 2505 of the frame engagement ledge 2410 properly faces the internal edge 1737 at the stop rail 1715. As mentioned before, the curved or hook-shape of the web engagement notch 2505 ensures a firmer or stronger grip of the tension web 110 sandwiched between the frame 215 and web bar 220 when tightened (see e.g., FIG. 7). The indicator guide flange 2810 of the indicator 225 is inserted through the web opening 1705 in the frame 215 and slides towards the insertion rail 1710 of the frame 215 in the manner shown in FIG. 40. As noted before with reference to FIG. 34, the indicator guide flange 2810 is recessed relative to the longitudinal tension indicator 315 by the recessed distance 3305 such that the indicator guide flange 2810 is able to be fitted through the web opening 1705 during assembly while at the same time the longitudinal tension indicator 315 is long enough to retain the indicator 225 when the web bar 220 is installed. The indicator guide flange 2810 is then able to clip underneath the insertion rail 1710 of the frame 215 (see e.g., FIG. 16). The lateral tension indicators 310 of the indicator 225 are able to slide along the alignment stile 1720 and guide stile 1725 of the frame 215. As discussed before with respect to FIGS. 34 and 35, the lateral tension indicators 310 are raised from the indicator guide flange 2810 by the lateral indicator height 3405. The indicator body 2805 in FIG. 35 is raised from the indicator guide flange 2810 by the frame edge engagement height 3505. The lateral indicator height 3405 of the lateral tension indicators 310 and the frame edge engagement height 3505 of the indicator body 2805 are generally the same and generally correspond to the frame thickness 1905 of the frame 215 (FIG. 19). With such dimensions, the indicator spring seat cavities 2835 are generally aligned with the internal edge 1737 of the frame 215 (FIG. 17) such that the indicator springs 235 are positioned for compression between the indicator body 2805 and the internal edge 1737 of the frame 215. In one example, the web bar springs 230 and indicator springs 235 are already attached to the indicator 225 before being secured to the frame 215. Alternatively, some or all of the web bar springs 230 and/or indicator springs 235 are secured to the indicator 225 after the indicator 225 is secured to the frame 215.

The cover 205 is then secured to the frame 215 by clipping the frame clips 920 of the cover 205 (FIG. 9) underneath the frame 215. In one variation, the tension web 110 is looped around the web bar 220, and the fixed web 115 is looped around indicator 225 in the manner as depicted in FIG. 7. This attachment of the tension web 110 and fixed web 115 to the adjuster indicator assembly 210 occurs in one form after the cover 205 is attached. In other examples, one or both webs are secured to the adjuster indicator assembly 210 before the cover 205 is secured to the frame 215.

Figure 41:
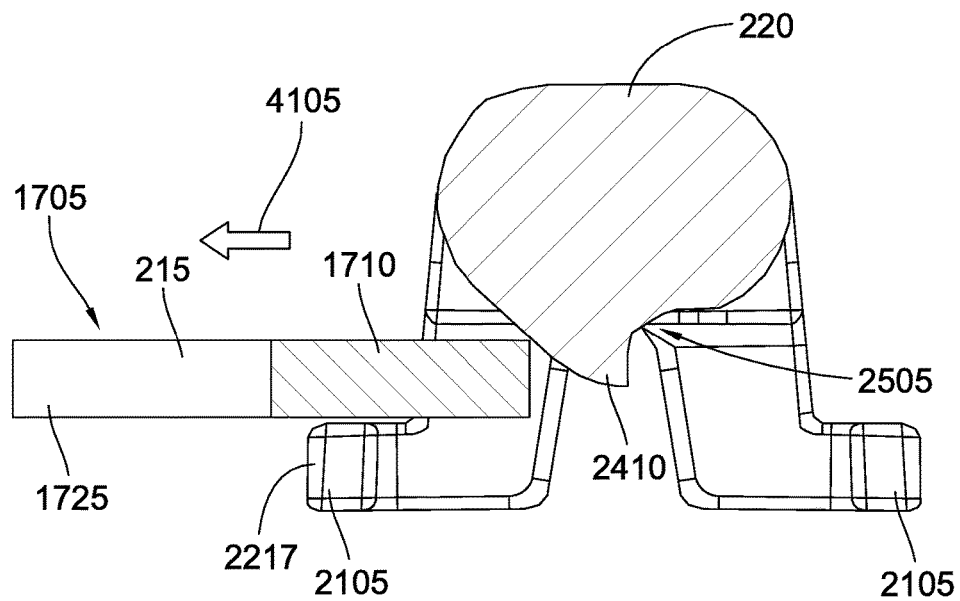
FIG. 41 is a partial cross-sectional view of during insertion of the FIG. 20 web bar backwards on the FIG. 17 frame.
Figure 42:
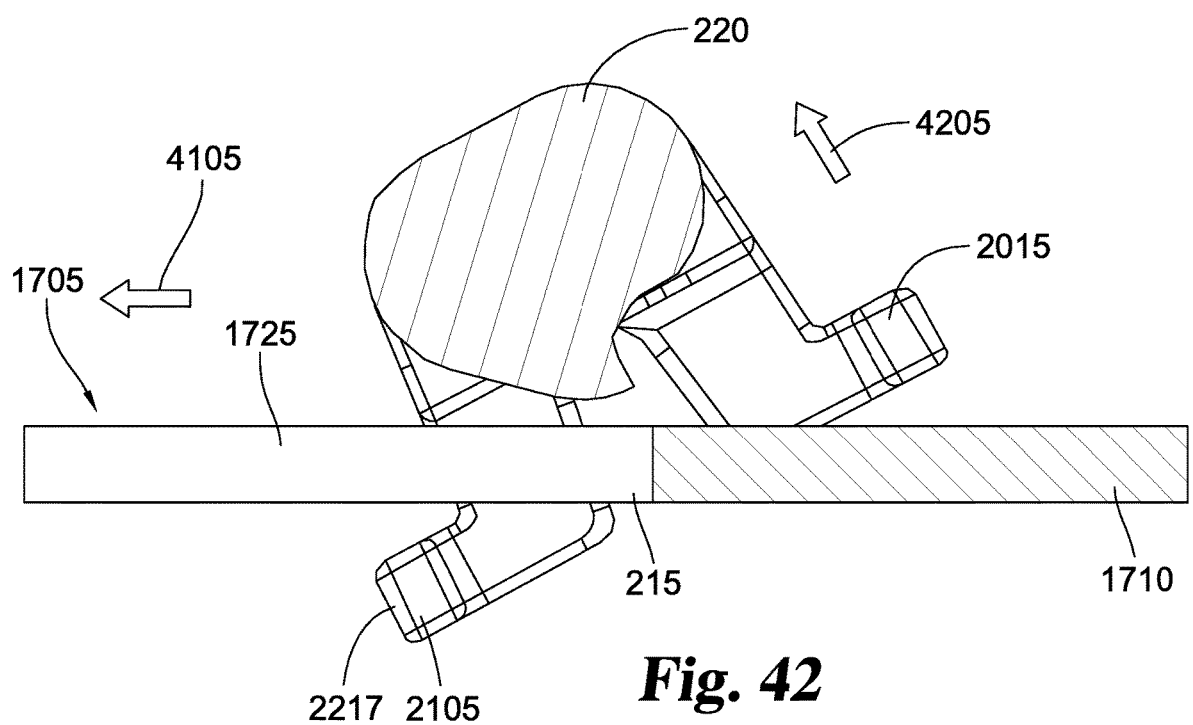
FIG. 42 is a partial cross-sectional view of the FIG. 20 web bar prevented from being seated backwards on the FIG. 17 frame.

FIGS. 41 and 42 show one example of how the frame 215 prevents the web bar 220 from being installed in the wrong orientation. Again, to ensure a tight vice grip of the tension web 110 between the frame 215 and web bar 220 during tightening, the web engagement notch 2505 should face the internal edge 1737 at the stop rail 1715. In the example shown in FIG. 41, the frame guide feet 2015 of the web bar 220 are slid underneath the frame 215 in the direction indicated by arrow 4105 until the frame engagement ledge 2410 hits the insertion rail 1710 of the frame 215. As indicated by arrow 4205 in FIG. 42, the web bar 220 is then rotated. The frame guide feet 2015 of the web bar 220 slides on top of the indicator section 915. However, without the orientation notch 1415, the frame guide feet 2015 of the web bar 220 are unable to hook underneath the frame 215. As should be recognized, this improper orientation would then be quite evident to the assembler and/or automated vision system. It also would be quite difficult to secure the frame guide feet 2015 to the frame 215.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Acute Angle" generally refers to an angle smaller than a right angle or less than 90 degrees.

"Asymmetric" generally refers to an object not being identical on both sides of a central line.

"Concave" generally refers to a surface that is hollowed or rounded inward in at least one dimension like the inside of a bowl or a groove.

"Frame" generally refers to a structure that forms part of an object and gives strength and/or shape to the object.

"Lateral" generally refers to being situated on, directed toward, or coming from the side.

"Longitudinal" generally relates to length or lengthwise dimension of an object, rather than across.

"Notch" generally refers to an indentation, cut, groove, channel, and/or incision on an edge or surface. In some non-limiting examples the notch includes a V-shaped or U-shaped indentation carved, scratched, etched, stamped, and/or otherwise formed in the edge or surface. The notch can have a uniform shape or a non-uniform shape.

"Pushbutton Adjuster" generally refers to a webbing or strap adjustment mechanism that releases the mechanism's hold on the webbing for the purpose of releasing tension and/or lengthening the webbing when a button is depressed. Typically, but not always, the pushbutton adjuster does not inhibit the webbing from being shortened when the free end of the webbing is pulled.

"Seat Belt", "Safety Belt", or "Vehicle Belt" generally refers to an arrangement of webs and other devices designed to restrain or otherwise hold a person or other object steady such as in a boat, vehicle, aircraft, and/or spacecraft. For example, the seat belt is designed to secure an occupant of a vehicle against harmful movement that may result during a collision or a sudden stop. By way of non-limiting examples, the seat belt can include webbing, buckles, latch plates, and/or length-adjustment mechanisms, such as a retractor, installed in the vehicle that is used to restrain an occupant or a child restraint system. The seat belt for instance can include a lap belt only, a combination lap-shoulder belt, a separate lap belt, a separate shoulder belt, and/or a knee bolster.

"Slide Adjuster" generally refers to hardware used to lock webbing at a fixed length using a single plate or at least a pair of plates with slots through which the webbing is threaded in a prescribed manner. By way of non-limiting examples, the slide adjuster may use one slide with three slots or two slides with two slots each. Typically, but not always, the webbing must be 3o detached and the webbing loops manually loosened to either shorten or lengthen the webbing.

"Spring" generally refers to an elastic object that stores mechanical energy. The spring can include a resilient device that can be pressed, pulled, and/or twisted but returns to its former shape when released. The spring can be made from resilient or elastic material such as metal and/or plastic The spring can counter or resist loads in many forms and apply force at constant or variable levels. For example, the spring can include a tension spring, compression spring, torsion spring, constant spring, and/or variable spring. The spring can take many forms such as by being a flat spring, a machined spring, and/or a serpentine spring. By way of nonlimiting examples, the springs can include various coil springs, pocket springs, Bonnell coils, offset coils, continuous coils, cantilever springs, volute springs, hairsprings, leaf springs, V-springs, gas springs, leaf springs, torsion springs, rubber bands, spring washers, and/or wave springs, to name just a few.

"Tilt-Lock Adjuster" generally refers to a webbing or strap adjustment mechanism that releases the mechanism's hold on the webbing for the purpose of releasing tension and/or lengthening the webbing when the mechanism is lifted and/or held at an angle that is generally transverse to the general longitudinal direction of the webbing. Typically, but not always, the tilt-lock adjuster does not inhibit the overall length of the webbing from being shortened when the free end of the webbing is pulled.

"Web" or "Webbing" generally refers to a strap made of a network of thread, strings, cords, wires, and/or other materials designed to restrain or otherwise hold a person or other object steady such as in a boat, vehicle, aircraft, and/or spacecraft. By way of non-limiting examples, the web can be incorporated into a seat belt, a child booster seat, and/or car seat.

"Window" generally refers to an opening or generally transparent panel in a wall of an object that facilitates interior viewing of the object.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

| Reference Numbers | |
| --- | --- |
| 100 tilt-lock adjuster system | 825 indicator notch |
| 105 tilt-lock adjuster | 905 ribs |
| 110 tension web | 910 tension web section |
| 115 fixed web | 915 indicator section |
| 120 belt adjuster end | 920 frame clips |
| 205 cover | 925 frame standoffs |
| 210 adjuster indicator assembly | 930 frame notches |
| 215 frame | 1205 trailing jamb edge |
| 220 web bar | 1210 leading jamb edge |
| 225 indicator | 1215 head jamb edge |
| 230 web bar springs | 1220 sill edge |
| 235 indicator springs | 1305 interior surface |
| 305 lateral windows | 1310 exterior surface |
| 310 lateral tension indicators | 1315 trailing jamb angle |
| 315 longitudinal tension indicator | 1405 frame orientation guide |
| 605 longitudinal axis | 1410 web bar orientation guide |
| 610 lateral axis | 1415 orientation notch |
| 705 grip cavity | 1705 web opening |
| 707 arrow | 1710 insertion rail |
| 710 web bar cavity | 1715 stop rail |
| 715 indicator cavity | 1720 alignment stile |
| 720 stop member | 1725 guide stile |
| 725 arrow | 1730 stop flanges |
| 730 arrow | 1735 peripheral edge |
| 800 cover body | 1737 internal edge |
| 805 grip end | 1740 insertion rail width |
| 810 indicator end | 1745 alignment tab |
| 815 lateral sidewalls | 1750 tab width |
| 820 grip protrusion | 1755 notch width |
| 1760 notch window distance | 2420 ledge width |
| 1762 ledge clearance distance | 2502 inner web bar width |
| 1765 stop window distance | 2505 web engagement notch |
| 1770 window width | 2605 stile facing surface |
| 1775 stile width | 2610 stile slot height |
| 1805 stop rail width | 2615 ledge height |
| 1810 insertion end width | 2620 guide gap height |
| 1905 frame thickness | 2625 feet ledge distance |
| 2005 frame guide | 2805 indicator body |
| 2010 bar | 2810 indicator guide flange |
| 2012 frame guide legs | 2815 indicator connection legs |
| 2015 frame guide feet | 2820 web guide channel |
| 2017 stile engaging surface | 2825 web bar spring seat cavities |
| 2020 frame stile slots | 2830 web bar spring pins |
| 2025 spring seat cavities | 2835 indicator spring seat cavities |
| 2205 exterior surface | 2840 indicator spring pins |
| 2210 interior surface | 2845 indicator spring grooves |
| 2215 foot guide width | 3305 recessed distance |
| 2217 key guide foot | 3405 lateral indicator height |
| 2220 bar exterior surface | 3505 frame edge engagement height |
| 2225 bar width | 3605 arrow |
| 2230 leg extension distance | 3705 arrow |
| 2235 guide foot gap | 4105 arrow |
| 2240 guide foot gap width | 4205 arrow |
| 2305 frame guide width | |
| 2310 feet tip distance | |

-continued

| Reference Numbers |
|---|
| 2405 web guide surface |
| 2410 frame engagement ledge |
| 2415 stile slot width |

What is claimed is:

1. A tilt-lock adjuster system, comprising:
  webbing extending in a longitudinal direction when in tension
  a tilt-lock adjuster configured to tension the webbing, the tilt-lock adjuster including
    an indicator configured to indicate when proper tension is applied to webbing secured by the tilt-lock adjuster,
    a frame to which the indicator is slidably coupled, wherein the frame defines a web opening with an internal edge,
    a web bar slidably coupled to the frame
    wherein the web bar has a frame engagement ledge extending into the web opening of the frame to press the webbing against the internal edge of the web opening,
    wherein the tilt-lock adjuster has a locked position where the web bar presses the webbing against the internal edge of the web opening, and
    wherein the tilt-lock adjuster has a released position where the tilt-lock adjuster is lifted at an angle that is transverse to the longitudinal direction of the webbing to move the web bar away from the internal edge of the web opening to release the webbing.

2. The system of claim 1, wherein the web bar is asymmetric for one way assembly with the frame.

3. The system of claim 2, wherein the web bar has a web engagement notch that is concave for enhancing locking of the webbing to the frame.

4. The system of claim 3, wherein the web bar has a frame guide slidably engaged to the frame.

5. The system of claim 4, wherein the frame engagement ledge that defines a guide gap height that is smaller than a frame thickness of the frame.

6. The system of claim 5, wherein:
  the frame guide of the web bar includes a key guide foot; and
  the frame has an orientation notch configured to receive the key guide foot of the web bar.

7. The system of claim 2, wherein the web bar and the indicator are configured to move independently of one another.

8. The system of claim 7, wherein the tilt-lock adjuster includes one or more web bar springs positioned between the web bar and the indicator.

9. The system of claim 1, wherein the indicator includes:
  one or more lateral tension indicators; and
  a longitudinal tension indicator.

10. The system of claim 9, wherein the tilt-lock adjuster includes a cover having one or more lateral windows in which the lateral tension indicators are visible when the proper tension is applied to the webbing.

11. The system of claim 9, wherein the lateral windows have one or more edges that are angled at an acute angle to enhance visibility of the lateral tension indicators.

12. The system of claim 9, wherein the indicator includes an indicator guide flange that is recessed relative to the longitudinal tension indicator.

13. The system of claim 1, wherein the indicator includes one or more indicator springs to bias the indicator in a retracted position.

14. The system of claim 13, wherein the indicator includes one or more indicator spring seat cavities where the indicator springs are secured.

15. The system of claim 1, wherein the frame includes a frame orientation guide and a web bar with a web bar orientation guide.

16. The system of claim 1, wherein the tilt-lock adjuster includes a cover with one or more ribs defining an indicator cavity in which the indicator is retained.

17. A tilt-lock adjuster system, comprising:
  a tilt-lock adjuster including
    an indicator configured to indicate when proper tension is applied to webbing secured by the tilt-lock adjuster, and
    wherein the indicator includes one or more lateral tension indicators.

18. The system of claim 17, wherein the indicator includes a longitudinal tension indicator.

19. The system or claim 17, further comprising:
  a cover having one or more lateral windows in which the lateral tension indicators are visible when the proper tension is applied to the webbing.

20. A tilt-lock adjuster system, comprising:
  a tilt-lock adjuster including
    an indicator configured to indicate when proper tension is applied to webbing secured by the tilt-lock adjuster, and
    a frame with a frame orientation guide and a web bar with a web bar orientation guide.

21. The system of claim 20, wherein the web bar is asymmetric for one way assembly with the frame.

22. The system of claim 20, wherein the web bar has a web engagement notch that is concave for enhancing locking of the webbing to the frame.

23. The system of claim 20, wherein the web bar has a frame guide slidably engaged to the frame.

24. The system of claim 20, wherein the web bar has a frame engagement ledge that defines a guide gap height that is smaller than a frame thickness of the frame.

* * * * *

UNITED STATES PATENT AND TRADEMARK OFFICE
CERTIFICATE OF CORRECTION

PATENT NO. : 10,897,963 B2
APPLICATION NO. : 16/010633
DATED : January 26, 2021
INVENTOR(S) : Christopher Geist Page 1 of 1

It is certified that error appears in the above-identified patent and that said Letters Patent is hereby corrected as shown below:

In the Claims
Column 17, Claim 5, Line 43, replace "ledge that defines" with --ledge defines--
Column 17, Claim 7, Line 50, replace "claim 2" with --claim 1--

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*